US012619914B2

(12) United States Patent
Bruce et al.

(10) Patent No.: US 12,619,914 B2
(45) Date of Patent: May 5, 2026

(54) APPARATUS AND METHODS FOR ARTIFICIAL INTELLIGENCE MODEL MANAGEMENT

(71) Applicant: LEVATAS, INC., West Palm Beach, FL (US)

(72) Inventors: Daniel William Bruce, Palm Beach Gardens, FL (US); Santiago Luis Valdarrama del Pino, Wellington, FL (US)

(73) Assignee: Levatas, Inc., West Palm Beach, FL (US)

(*) Notice: Subject to any disclaimer, the term of this patent is extended or adjusted under 35 U.S.C. 154(b) by 572 days.

(21) Appl. No.: 18/033,205

(22) PCT Filed: Oct. 22, 2021

(86) PCT No.: PCT/US2021/056169
§ 371 (c)(1),
(2) Date: Apr. 21, 2023

(87) PCT Pub. No.: WO2022/087351
PCT Pub. Date: Apr. 28, 2022

(65) Prior Publication Data
US 2023/0394355 A1      Dec. 7, 2023

Related U.S. Application Data

(60) Provisional application No. 63/104,807, filed on Oct. 23, 2020.

(51) Int. Cl.
*G06N 20/00* (2019.01)

(52) U.S. Cl.
CPC ................................... *G06N 20/00* (2019.01)

(58) Field of Classification Search
CPC ..................................................... G06N 20/00
See application file for complete search history.

(56) References Cited

U.S. PATENT DOCUMENTS 10,083,304 B2 * 9/2018 Chhabra ................. G06F 21/32
10,235,602 B1 * 3/2019 Vasisht ................. G06F 16/583
(Continued)

FOREIGN PATENT DOCUMENTS

CN          109784867          5/2019
CN          111144578          5/2020

*Primary Examiner* — Vinh T Lam
(74) *Attorney, Agent, or Firm* — DUANE MORRIS LLP; Karen C. Kline

(57) ABSTRACT

An artificial intelligence (AI) model management system is disclosed. The system may receive data, such as image data, as part of a task to be completed. The system may apply an AI model, such as a machine learning algorithm, to the data. The system may also generate performance data based on performance of the AI model, and determine whether to route AI model results for verification. During verification, one or more inputs are received indicating whether the AI model results are correct and, if not correct, a correct result. The system may determine which inputs indicate a correct result if, for example, the inputs do not indicate the same correct result. The AI model may be trained in real-time based on the verified or corrected results. In some examples, the system causes one or more actions to be taken upon completion of the task.

20 Claims, 16 Drawing Sheets

(56) References Cited

U.S. PATENT DOCUMENTS

| | | | |
|---|---|---|---|
| 10,706,030 B2 * | 7/2020 | Ghatage | G06F 16/252 |
| 10,708,363 B2 * | 7/2020 | Shi | H04L 41/16 |
| 10,891,374 B1 * | 1/2021 | Curtin | G06N 3/09 |
| 10,936,915 B2 * | 3/2021 | Vasisht | G06V 10/764 |
| 11,113,653 B2 * | 9/2021 | Ghosh | G06Q 10/06393 |
| 11,409,995 B2 * | 8/2022 | Bos | G06F 18/2411 |
| 11,410,758 B2 * | 8/2022 | Lyman | G16H 15/00 |
| 11,481,636 B2 * | 10/2022 | Ramachandran | G06N 3/084 |
| 11,537,899 B2 * | 12/2022 | Ramachandran | G06F 18/2433 |
| 11,714,831 B2 * | 8/2023 | Makhija | G06F 16/288 |
| | | | 706/20 |
| 11,847,217 B2 * | 12/2023 | Healy | G06N 3/0464 |
| 2017/0061285 A1 * | 3/2017 | Hikone | G06N 20/00 |
| 2018/0285766 A1 * | 10/2018 | Shen | G06F 11/3017 |
| 2020/0210924 A1 | 7/2020 | Ghosh | |
| 2021/0056411 A1 * | 2/2021 | Jung | G06N 3/096 |
| 2021/0104178 A1 * | 4/2021 | Buras | G16H 40/63 |
| 2021/0133588 A1 * | 5/2021 | Wong | G06N 3/063 |
| 2021/0166822 A1 * | 6/2021 | Bendersky | G06N 5/04 |
| 2021/0201270 A1 * | 7/2021 | Cross | G06N 5/022 |

* cited by examiner

START

500

502

RECEIVE IMAGE DATA

504

APPLY AN ALGORITHM TO THE IMAGE DATA TO GENERATE OUTPUT DATA

506

DETERMINE, BASED ON PERFORMANCE DATA, TO ROUTE THE OUTPUT DATA FOR VERIFICATION

508

RECEIVE INPUT DATA VERIFYING THE OUTPUT DATA

510

CAUSE AT LEAST ONE ACTION TO BE TAKEN BASED ON THE INPUT DATA VERIFYING THE OUTPUT DATA

END

APPARATUS AND METHODS FOR ARTIFICIAL INTELLIGENCE MODEL MANAGEMENT

CROSS-REFERENCE TO RELATED APPLICATIONS

This application is a § 371 national stage entry of International Application No. PCT/US2021/056169, filed on Oct. 22, 2021, which claims priority to U.S. Provisional Application Ser. No. 63/104,807, filed on Oct. 23, 2020 and entitled "APPARATUS AND METHODS FOR ARTIFICIAL INTELLIGENCE MODEL MANAGEMENT," the entire contents of which are incorporated herein by reference in their entirety.

TECHNICAL FIELD

This disclosure relates generally to artificial intelligence (AI) model based systems and, more specifically, to the implementation and management of AI models in AI model based systems.

BACKGROUND

Systems, especially large systems, may include various components. For example, manufacturing systems, electrical systems (e.g., energy producing systems), defense systems, surveillance systems, and transportation systems (e.g., vehicles), among many others, may include various components that work together to produce a result (e.g., an output, a product, etc.). Often times, however, one or more of the components of a system may fail, causing the system to stall or even shut down. At least some systems require the supervision of one or more technicians to assure system components are running without fault. Additionally, some systems may employ component fault detection mechanisms that detect when a component needs service or repair. However, in each case, the systems may need to be shut down for repair once a faulty component is identified, resulting in unexpected shutdown of the system. For example, a system may need to be shut down to fix a faulty component during a temporal period that, otherwise, the system would have spent running to produce results. As such, there are opportunities to improve fault detection in systems.

SUMMARY

In some examples, at least one computing device is configured to receive input data from at least one device, and determine at least one classification based on applying an artificial intelligence model to the received input data. The, at least one computing device is also configured to determine a performance of the artificial intelligence model based on previous classifications made by the artificial intelligence mode. Further, the at least one computing device is configured to determine whether to provide the classification for verification based on the performance of the artificial intelligence model. If the determination is to provide the classification for verification, the at least one computing device is configured to provide the classification for user verification. If, however, the determination is to not provide the classification for verification, the at least one computing device is configured to take at least one action based on the classification.

In some examples, a method by one or more computing devices includes receiving input data from at least one device, and determining at least one classification based on applying an artificial intelligence model to the received input data. The method also includes determining a performance of the artificial intelligence model based on previous classifications made by the artificial intelligence mode. Further, the method includes determining whether to provide the classification for verification based on the performance of the artificial intelligence model. If the determination is to provide the classification for verification, the method includes providing the classification for user verification. If, however, the determination is to not provide the classification for verification, the method includes taking at least one action based on the classification.

In some examples, a non-transitory computer readable medium stores instructions thereon that, when executed by at least one processor, cause the at least one processor to perform operations including receiving input data from at least one device, and determining at least one classification based on applying an artificial intelligence model to the received input data. The operations also include determining a performance of the artificial intelligence model based on previous classifications made by the artificial intelligence mode. Further, the operations include determining whether to provide the classification for verification based on the performance of the artificial intelligence model. If the determination is to provide the classification for verification, the operations includes providing the classification for user verification. If, however, the determination is to not provide the classification for verification, the operations include taking at least one action based on the classification.

In some examples, at least one computing device is configured to receive a task from at least one device, and determine at least one classification based on applying an artificial intelligence model to input data identified by the task. The at least one computing device is also configured to determine a time threshold for the task. Further, the at least one computing device is configured to determine whether to provide the classification for verification based on the time threshold. If a verification response can be received within the time threshold, the at least one computing device is configured to provide the classification for user verification. If, however, the verification response cannot be received within the time threshold, the at least one computing device is configured to take at least one action based on the classification.

In some examples, a method by one or more computing devices includes receiving a task from at least one device, and determining at least one classification based on applying an artificial intelligence model to input data identified by the task. The method also includes determining a time threshold for the task. Further, the method includes determining whether to provide the classification for verification based on the time threshold. If a verification response can be received within the time threshold, the method includes providing the classification for user verification. If, however, the verification response cannot be received within the time threshold, the method includes taking at least one action based on the classification.

In some examples, a non-transitory computer readable medium stores instructions thereon that, when executed by at least one processor, cause the at least one processor to perform operations including receiving a task from at least one device, and determining at least one classification based on applying an artificial intelligence model to input data identified by the task. The operations also include determining a time threshold for the task. Further, the operations include determining whether to provide the classification for verification based on the time threshold. If a verification response can be received within the time threshold, the operations include providing the classification for user verification. If, however, the verification response cannot be received within the time threshold, the operations include taking at least one action based on the classification.

BRIEF DESCRIPTION OF THE DRAWINGS

The features and advantages of the present disclosures will be more fully disclosed in, or rendered obvious by the following detailed descriptions of example embodiments. The detailed descriptions of the example embodiments are to be considered together with the accompanying drawings wherein like numbers refer to like parts and further wherein.

DETAILED DESCRIPTION

Figure 1:
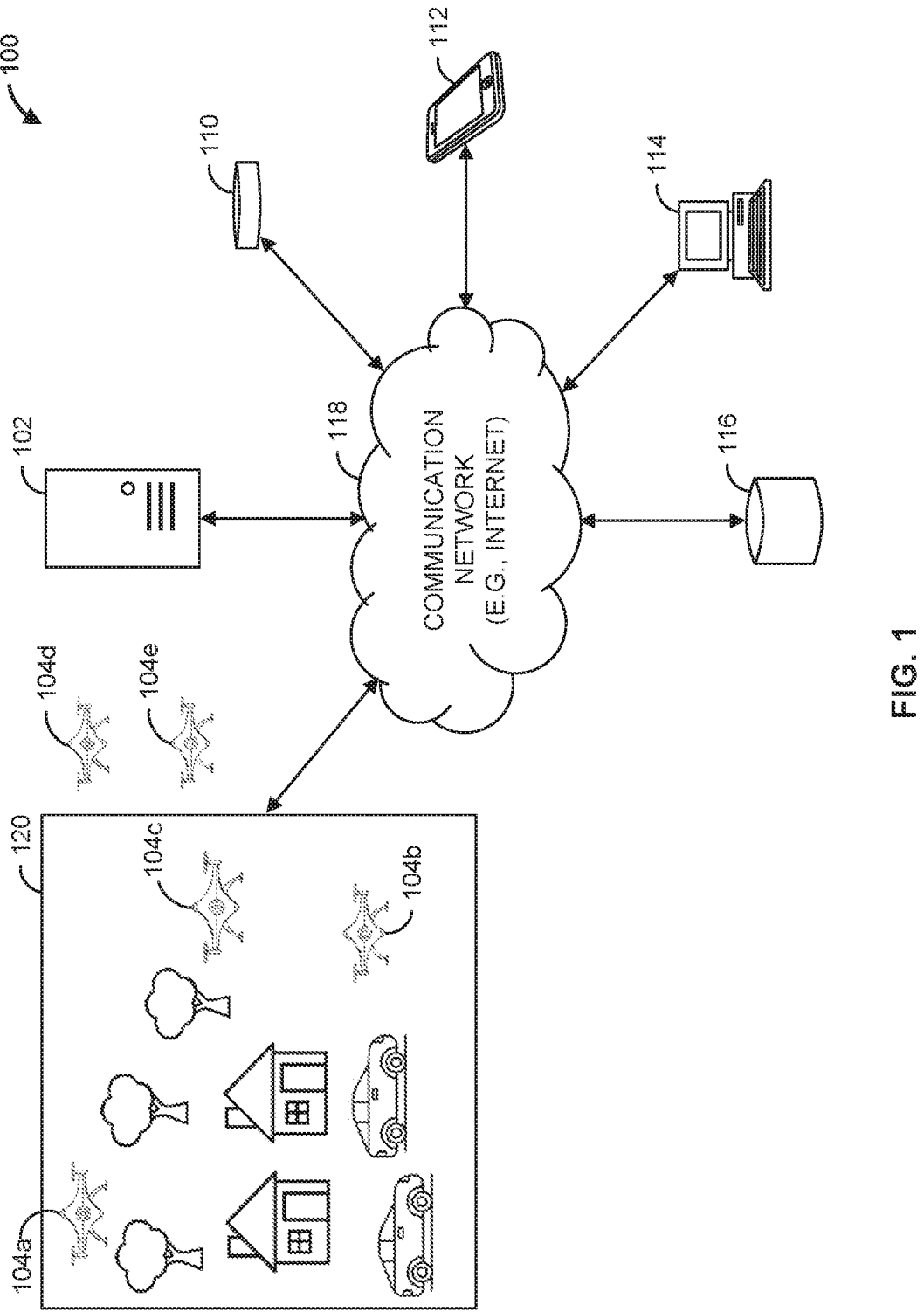
FIG. 1 illustrates an artificial intelligence (AI) management system in accordance with some embodiments.

The description of the preferred embodiments is intended to be read in connection with the accompanying drawings, which are to be considered part of the entire written description of these disclosures. It should be understood, however, that the present disclosure is not intended to be limited to the particular forms disclosed. Rather, the present disclosure covers all modifications, equivalents, and alternatives that fall within the spirit and scope of these exemplary embodiments.

In this description, relative terms such as "horizontal," "vertical," "up," "down," "top," "bottom," as well as derivatives thereof (e.g., "horizontally," "downwardly," "upwardly," etc.) should be construed to refer to the orientation as then described or as shown in the drawing figure under discussion. These relative terms are for convenience of description and normally are not intended to require a particular orientation. Terms including "inwardly" versus "outwardly," "longitudinal" versus "lateral" and the like are to be interpreted relative to one another or relative to an axis of elongation, or an axis or center of rotation, as appropriate. The terms "couple," "coupled," "operatively coupled," "operatively connected," and the like should be broadly understood to refer to connecting devices or components together either mechanically, electrically, wired, wirelessly, or otherwise, such that the connection allows the pertinent devices or components to operate (e.g., communicate) with each other as intended by virtue of that relationship.

Turning to the drawings, FIG. 1 shows a block diagram of an artificial intelligence (AI) model management system 100 that includes an AI model management computing device 102, a plurality of drones 104A, 104B, 104C, 104D, 104E, customer computing devices 110, 112, 114, and a database 116. Each drone 104 is operable to provide still image and/or video data of an area 120. For example, each drone 104 may include a camera that can capture images of area 120 as it flies or hovers over area 120. In addition, each drone may be operated (e.g., wirelessly) by one or more users (users not illustrated). Although in this example six drones 104 are shown, in other examples a differing number of drones may be employed by the AI model management system 100. Although drones 104 are illustrated in this examples, AI model management system 100 may include other sources of image data. For example, AI model management system 100 may include one or more audio streaming devices, one or more sensors, one or more external databases, or one or more eternal servers.

AI model management computing device 102 may be communicatively coupled to database 116 via communication network 118. Communication network 118 can be a WiFi® network, a cellular network such as a 3GPP® network, a Bluetooth® network, a satellite network, a wireless local area network (LAN), a network utilizing radio-frequency (RF) communication protocols, a Near Field Communication (NFC) network, a wireless Metropolitan Area Network (MAN) connecting multiple wireless LANs, a wide area network (WAN), or any other suitable network. Communication network 118 can provide access to, for example, the Internet. AI model management computing device 102 may transmit data to, and receive data from, communication network 118.

AI model management computing device 102 and customer computing devices 110, 112, 114 may include hardware or hardware and software for processing data, such as image data or audio data. For example, AI model management computing device 102 may include one or more processors, one or more field-programmable gate arrays (FPGAs), one or more application-specific integrated circuits (ASICs), one or more state machines, digital circuitry, or any other suitable circuitry. In some examples, each of AI model management computing device 102 and customer computing devices 110, 112, 114 may be, for example, an application server, a cloud-based server, a computer, a workstation, a laptop, a tablet, a mobile device such as a cellular phone, or any other suitable computing device.

AI model management computing device 102 may also be communicatively coupled to drones 104, such as via communication network 118. For example, AI model management computing device 102 may receive still image data and/or video image data (collectively, image data) from each of drones 104A, 104B, 104C, 104D, and 104E.

In some examples, AI model management computing device 102 applies an AI model (e.g., AI algorithm, machine learning algorithm) to image data received from drones 104 to determine one or more actions to be taken (e.g., such as by AI model management computing device 102 or by another computing device). An action may include, for example, transmitting a communication (e.g., electronic mail (e-mail), short-message-service (SMS) message (e.g., text message) through a communication channel (e.g., a HyperText Transfer Protocol (HTTP) endpoint). An action may also include, for example, pushing information (e.g., via an API) to a 3rd party system. The receiving end of the communication channel may reside with another computing device, such as one or more of customer computing devices 110, 112, 114. The communication may identify, for example, status or conditions (e.g., faults) of systems or components of systems located in area 120.

Although in this example AI model management computing device 102 is operating in a use case where AI model management computing device 102 receives image data from drones 104 to determine status, such as faults, with systems or system components of area 120, AI model management computing device 102 may also operate in other use cases as well.

For example, AI model management computing device 102 may operate in other use cases involving component fault detection. This problem spans across many different industries and typically involves identifying faults compo-nents of large systems (for example, wind turbines, manu-facturing equipment, solar panels, leaking or corroded pipes, electrical circuits, etc.). Across industries, issues may have similar characteristics.

Typically, there is a high value placed on proactive identification of pre-fault states. Undetected fault states tend to degrade over time, leading to increasingly degraded and or dangerous performance for the system. It is also often much more expensive to address faults reactively rather than proactively. For example, early detection of degraded per-formance for a turbine can allow for repair during a regularly scheduled maintenance window where there will be no loss to output/production. On the other hand, reacting to cata-strophic faults is often much more expensive, requiring a system to be taken offline for an extended period resulting in increased cost and/or lost revenue.

Moreover, in many cases, performing a human review of systems or system components is impractical or impossible to complete in a timely fashion. For example, in some situations there may be millions of components to be reviewed to identify faults. Relative to the total number of components in the system, at any given point, only a small minority of components will potentially be in a fault state. Given only the option of human review, it can be more expensive to do a periodic review of every component than to simply react to fault states as they present themselves. AI model management computing device 102, however, may reduce costs associated with faults by automatically detect-ing faults early on.

Fault detection systems can make, for example, at least two primary mistakes, a false positive (e.g., identifying a component as faulty when it isn't) or a false negative (e.g., identifying a component as not faulty when it is). Both types of mistakes can result in a cost to the operator of the system, but the costs associated with each may differ. For example, a false negative detection may result in a faulty component going unnoticed thereby resulting in a very expensive sys-tem degradation or failure. A false positive detection, on the other hand, may result in a human operator reviewing the supposed fault, which results in that human operator taking time (and potentially using resources) only to verify that there is not a fault.

In many cases, the cost of a false negative detection may be many orders of magnitude higher than the cost of a false positive detection. For example, in some systems, a false negative detection can lead to a component faulting and shutting down a system. Costs may include costs to identify and fix the fault, as well as lost revenue while the system was shut down. False positive detections usually result in costs associated with having a human review the supposed faulty component. AI model management system 100 may reduce, for example, one or more of false positive detection rates and false negative detection rates as compared with current fault detection systems. AI model management computing device 102 may be employed in other types of use cases as well.

In addition, although FIG. 1 illustrates a single AI model management computing device 102, in some examples, the functions of AI model management computing device 102 may be performed by multiple computing devices. For example, one or more of the functions of AI model man-agement computing device 102 described herein may be performed by one or more servers, cloud-based servers, computing devices of a distributed network, or any suitable computing device.

Figure 2:
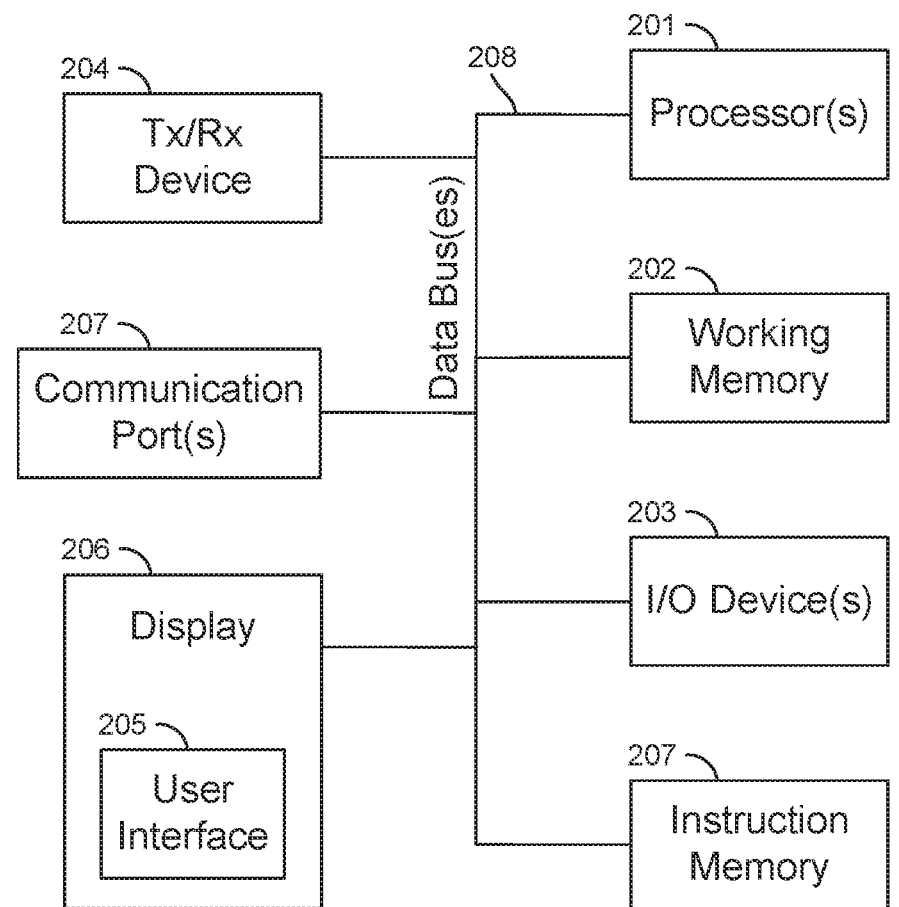
FIG. 2 illustrates an example of an AI model management computing device of the AI model management system of FIG. 1 in accordance with some embodiments.

FIG. 2 illustrates more details of AI model management computing device 102. As illustrated in FIG. 2, AI model management computing device 102 may include one or more processors 201, a working memory 202, one or more input/output devices 203, an instruction memory 207, a transceiver 204, one or more communication ports 207, and a display 206, all operatively coupled to one or more data buses 208. Data buses 208 allow for communication among the various devices. Data buses 208 can include wired, or wireless, communication channels.

Processor(s) 201 can include one or more distinct pro-cessors, each having one or more cores. Each of the distinct processors can have the same or different structure. Proces-sors 201 can include one or more central processing units (CPUs), one or more graphics processing units (GPUs), application specific integrated circuits (ASICs), digital sig-nal processors (DSPs), and the like.

Instruction memory 207 can store instructions that can be accessed (e.g., read) and executed by processors 201. For example, instruction memory 207 can be a non-transitory, computer-readable storage medium such as a read-only memory (ROM), an electrically erasable programmable read-only memory (EEPROM), flash memory, a removable disk, CD-ROM, any non-volatile memory, or any other suitable memory.

Processors 201 can be configured to perform a certain function or operation by executing code, stored on instruc-tion memory 207, embodying the function or operation. For example, processors 201 can be configured to perform one or more of any function, method, or operation disclosed herein, such as the application of an AI model to image data obtained from drones 104.

Processors 201 can store data to, and read data from, working memory 202. For example, processors 201 can store a working set of instructions to working memory 202, such as instructions loaded from instruction memory 207. Processors 201 can also use working memory 202 to store dynamic data created during the operation of AI model management computing device 102. Working memory 202 can be a random access memory (RAM) such as a static random access memory (SRAM) or dynamic random access memory (DRAM), or any other suitable memory.

Input-output devices 203 can include any suitable device that allows for data input or output. For example, input-output devices 203 can include one or more of a keyboard, a touchpad, a mouse, a stylus, a touchscreen, a physical button, a speaker, a microphone, or any other suitable input or output device.

Communication port(s) 207 can include, for example, a serial port such as a universal asynchronous receiver/transmitter (UART) connection, a Universal Serial Bus (USB) connection, or any other suitable communication port or connection. In some examples, the communication port(s) 207 allows for the programming of executable instructions in instruction memory 207. In some examples, the communication port(s) 207 allow for the transfer (e.g., uploading or downloading) of data, such as image data.

Display 206 can display user interface 205. User interfaces 205 can enable user interaction with AI model management computing device 102. For example, user interface 205 can be a user interface for an application that allows for the viewing and manipulation of images of materials as well as material data. In some examples, a user can interact with user interface 205 by engaging input-output devices 203.

Transceiver 204 may be any suitable communication unit that allows for communication with a network, such as communication network 118 of FIG. 1. In some examples, transceiver 204 is selected based on the type of communication network 118 AI model management computing device 102 will be operating in. For example, if communication network 118 of FIG. 1 is a WiFi® network, transceiver 204 is configured to allow communications with the WiFi® network. Processor(s) 201 is operable to receive data from, or send data to, a network, such as communication network 118 of FIG. 1, via transceiver 204.

Figure 3:
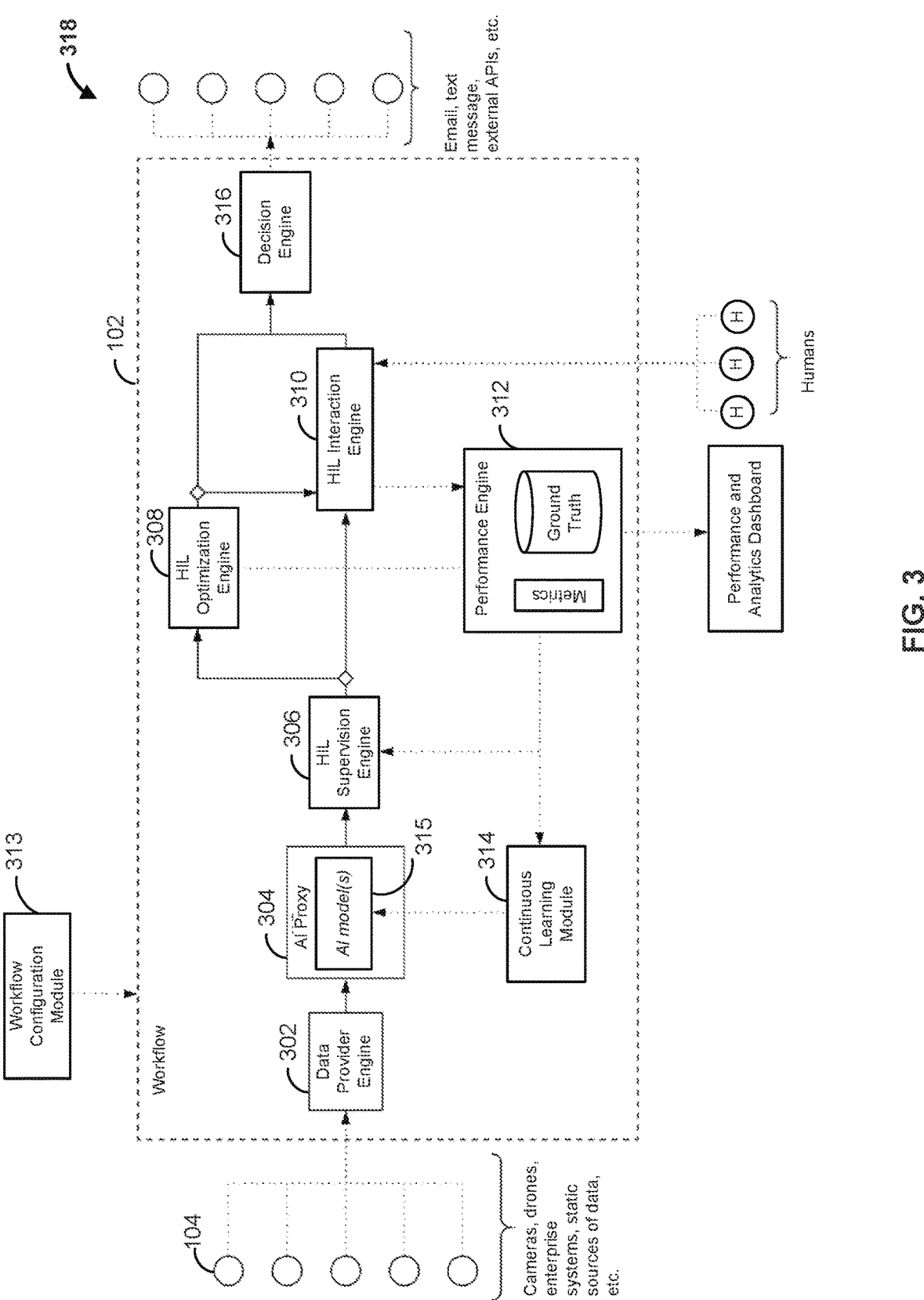
FIG. 3 illustrates exemplary portions of the AI model management computing device of FIG. 2 in accordance with some embodiments.

FIG. 3 is a block diagram illustrating further details of the AI model management computing device 102 of FIG. 1. As indicated in the figure, AI model management computing device 102 includes data provider engine 302, AI proxy engine 304, Human-In-The-Loop (HIL) supervision Engine 306, HIL Optimization engine 308, HIL Interaction engine 310, performance engine 312, continuous learning engine 314, and decision engine 316. In some examples, one or more of data provider engine 302, AI proxy engine 304, Human-In-The-Loop (HIL) supervision Engine 306, HIL optimization engine 308, HIL interaction engine 310, performance engine 312, continuous learning engine 314, and decision engine 316 may be implemented in hardware. In some examples, one or more of data provider engine 302, AI proxy engine 304, Human-In-The-Loop (HIL) supervision Engine 306, HIL Optimization engine 308, HIL Interaction engine 310, performance engine 312, continuous learning engine 314, and decision engine 316 may be implemented as an executable program maintained in a tangible, non-transitory memory, such as instruction memory 207 of FIG. 2, that may be executed by one or processors, such as processor 201 of FIG. 2.

Data provider engine 302 is configured to provide data, such as images and, in some examples, metadata associated with the data, such as metadata associated with images. Data provider engine 302 may obtain the data from any source, such as a camera (e.g., video camera). In this example, data provider engine 302 obtains images (e.g., image data) from cameras of drones 104. In some examples, data provider engine 302 may obtain images from other sources such as third-party push application programing interfaces (APIs). For example, a third party, such as a client, may provide (e.g., push) images to data provider engine 302 via a network, such as communication network 118, over an API provided by AI model management computing device 102. In some examples, data provider engine 302 may obtain images from a database, such as database 116. In some examples, data provider engine 302 may obtain images from the cloud, such as from one or more cloud-based servers. In some examples, data provider engine 302 may execute a protocol, such as File Transfer Protocol (FTP), to obtain the images.

Figure 4A:
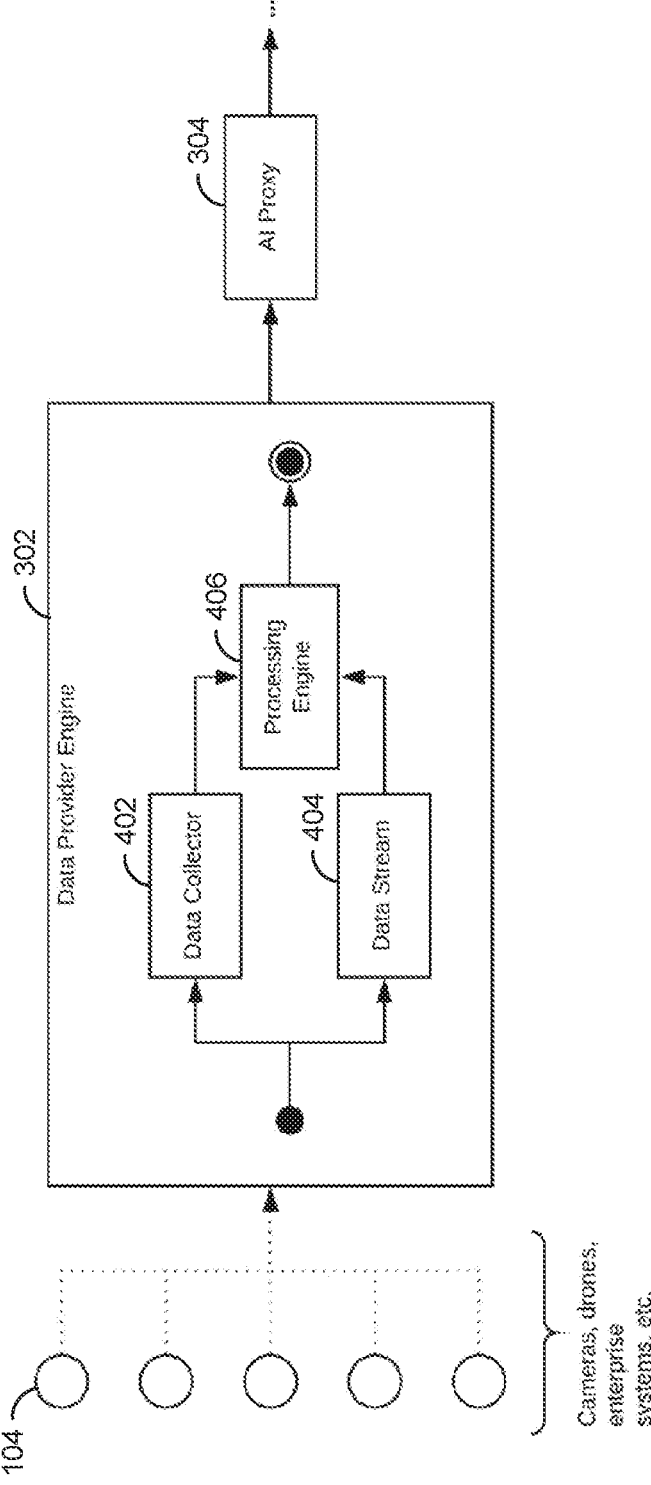
FIGS. 4A-4C illustrate further details of the exemplary portions of the AI model management computing device of FIG. 2 illustrated in FIG. 3 in accordance with some embodiments.

FIG. 4A shows an example of data provider engine 302. In this example, data provider engine 302 includes data collector module 402, which is configured to obtain data, such as images, and associated metadata from static sources, such as a database. For example, data collector module 402 may read input data, such as individual images, and related metadata information stored in database 116, or in a cloud server, for example Data collector module 402 provides the data to processing engine 406.

Data provider engine 302 may also include data stream module 404, which is configured to regulate a stream of data, such as images, to a particular (e.g., specified) rate. For example, data provider engine 302 may be communicatively coupled to a video camera (e.g., of drones 104) producing a live video feed at 24 frames per second. Data stream module 404 may sample individual frames from the live video feed at a rate specified as part of a configuration of a current workflow (e.g., as specified by a user via input/output device 203). Assuming a sample rate of 1 image every 2 seconds, for example, every 48 frames generated by the live feed a single still image will be processed by data stream module 404. Data stream module 404 may provide the data to processing engine 406.

After receiving image data from either data collector module 402 or data stream module 404, processing engine 406 generates task summaries and sends the task summaries to AI proxy engine 304. A task summary may include, for example, input data such as one or more images, associated metadata (e.g., GPS coordinates of an image, data identifying who took the image, data identifying when the image was taken, etc.), and data identifying one or more constraints (e.g., a cost and time to complete the task). A task may also identify a desired objective, such as an objective of identifying all faulty electrical components. For example, each task summary may contain data information, such as image data information, as well as any related metadata. The metadata may obtained from one or more sources. For example, the metadata may be obtained from image exchangeable image file format (EXIF) data, which is metadata embedded in the image itself. Processing engine 406 may extract the metadata from the image, for example. In some examples the metadata is external related metadata, which is metadata associated with an image and provided to data provider engine 302 in, for example, a different file. Processing engine 406 may parse the file to obtain the metadata, for example. In some examples, data provider engine 302 obtains manually-configured metadata, which may be provided by a user (e.g., via input/output device 203).

Referring back to FIG. 3, AI proxy engine 304 may host an AI model 315 (e.g., one or more AI algorithms, machine learning algorithms, etc.). AI proxy engine 304 may facilitate communications with AI model 315, such as by providing data to, and receiving data from, AI model 315.

Figure 4B:
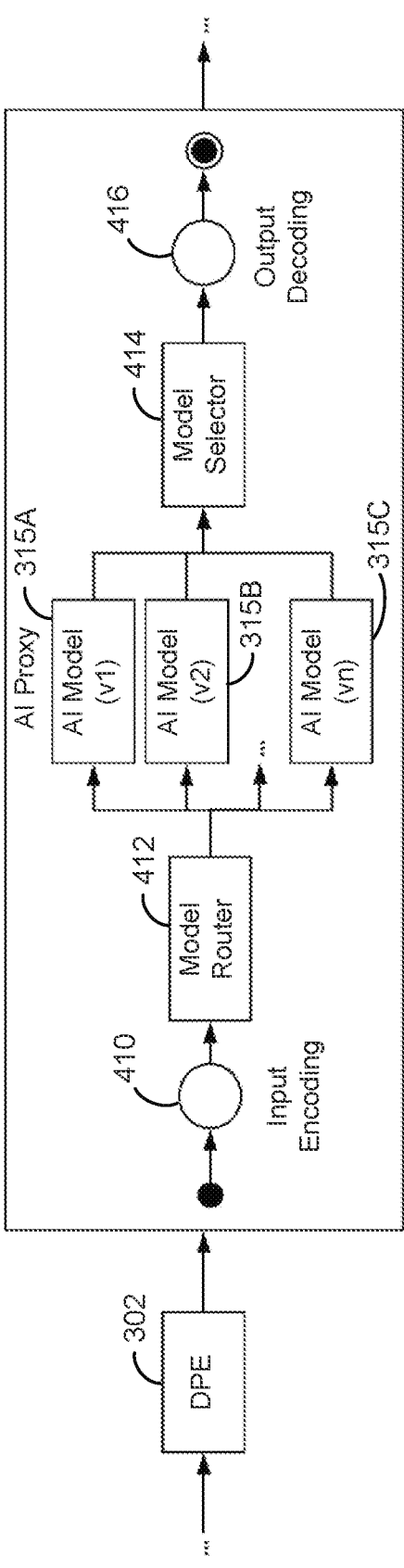

For example, FIG. 4B illustrates an example of AI proxy engine 304. In this example, AI model 315 may encode data back and forth to and from AI model 315. As illustrated, AI proxy engine 304 may receive data (e.g., tasks, information) from data provider engine 302, and may transform the data to an input format expected by AI model 315. In this example, the input data is encoded by an encoding module 410. The encoded input data is then provided to model router 412, which may direct the encoded input data to one or more AI models 315A, 315B, 315C. In some examples a user, via input/output device 203, may enable one or more AI models 315A, 315B, 315C. The enabled AI models 315A, 315B, 315C may operate on data, for example. Each AI model 315A, 315B, 315C receiving the encoded input data may operate on the data to provide output data (e.g., data based on the application of the selected AI model 315A, 315B, 315C to the encoded input data).

AI proxy engine 304 may receive output data from data AI model 315, and may transform the output data to an input format expected by HIL supervision engine 306. In this example, model selector 414 selects an AI model 315A, 315B, 315C from which to receive output data, and provides the output data to output decoding module 416. Output decoding model 416 decodes the received output data to a format expected by HIL supervision engine 306.

In some examples (e.g., if running inference on input data, such as images, would take longer than an allowed time for an HTTP request), the communication with the AI proxy engine 304 is performed asynchronously. For example, a request to AI proxy engine 304 may be made without waiting for a response. Instead, the request may contain a callback mechanism, such as a callback endpoint, for AI proxy engine 304 to return the result (e.g., decoded output data) whenever the output data is ready.

As described above, in some examples AI proxy engine 304 may route data (e.g., tasks) through different AI models 315A, 315B, 315C. Model router 412 and model selector 414 may work in tandem to support this functionality. Model router 412 and model selector 414 may be configured in various ways, for example, to run inference through the various AI models 315A, 315B, 315C. For example, model router 412 and model selector 414 may be configured in a Manual Mode, a Transitional Mode, a Dynamic Mode, and a Transitional Mode, as described further below.

Manual Mode

When configuring AI model management computing device 102, a user can configure (e.g., set) AI proxy engine 304 to manual mode and specify which percentage of input tasks will go to each version of the model. Model router 412 will follow the specified split, routing the corresponding percentage of tasks through each of the AI models 315A, 315B, 315C. In this mode, since every task goes through a single AI model 315A, 315B, 315C, model selector 414 operates as a data pass-through for the result coming from each of the AI models 315A, 315B, 315C.

Transitional Mode

A user can configure AI proxy engine 304 to transitional mode. In this mode, the user may specify a total number of tasks necessary to fully transition from one AI model 315A, 315B, 315C to another AI model 315A, 315B, 315C. For example, in the case of two AI models, such as AI models 315A, 315B, model router 412 may distribute traffic in the following manner:

$$\text{version} = v1 \text{ if random}() < \frac{k}{n} \text{ else } v2 \qquad \text{(eq. 1)}$$

where:
  n is the total number of tasks necessary to fully transition all the traffic from the source model over the target model;
  k is the index of the current task; and random( ) is a function that generates a random number between two values, such as between 0 (inclusive) and 1.0 (exclusive).

The transitional mode is useful to, for example, gradually increase a load on a new AI model (e.g., a new version of an AI model version) while monitoring the transition process to avoid unexpected results with the new AI model. As with manual mode, since every task is routed through a single AI model 315A, 315B, 315C, model selector 414 operates as a pass-through for the result coming from each AI model 315A, 315B, 315C.

Dynamic Mode

A user can also configure AI proxy engine 304 to dynamic mode. When AI proxy engine 304 is operating in dynamic mode, AI proxy engine 304 obtains performance data (e.g., from performance engine 312) indicating system performance when using each AI model 315A, 315B, 315C. In some examples, the performance data indicates performance of the overall system when using a particular AI model, rather than the performance of an individual AI model 315A, 315B, 315C.

AI proxy engine 304 may also obtain contextual information in order to decide which AI model 315A, 315B, 315C to route tasks to. The contextual information may be a combination of input data (e.g., an image bitmap), metadata, and general metadata specified as part of the configuration of AI model management computing device 102. For example, model router 412 may determine that the AI model "A" (e.g., AI model 315A) performs better than the AI model "B" (e.g., AI model 315B) with images captured at night. Model router 412 may combine this AI model-specific determination with the overall system performance (e.g., as indicated by performance data received from performance engine 312) to make an AI model determination.

In some examples, model router 412 routes additional tasks (e.g., traffic) to models indicating higher performance. In some examples, regardless of how low performance is determined to be when using a specific AI model, model router 412 may route a minimum (e.g., baseline) amount of traffic to the specific AI model to determine whether the AI model improves in the future. As with manual and transitional modes, since every task is routed through a single AI model 315A, 315B, 315C, model selector 414 may operate as a pass-through for the result coming from each AI model 315A, 315B, 315C.

Parallel Mode

A user can also configure AI proxy engine 304 to operate in parallel mode. When operating in parallel mode, every task is routed through to each available AI model 315A, 315B, 315C, and the decision of which result to use is determined by model selector 414. In this particular mode, model router 412 simply pushes every task to every AI model, regardless of their past performance. In some examples, a user configures (e.g., enables) which AI models 315A, 315B, 315C are available for operation.

Parallel mode may be useful when the cost of running every task through multiple AI models 315A, 315B, 315C is negligible. This mode may also assume more relaxed time constraints to run tasks through the system, as additional synchronization is needed in model selector 414 to wait for all available AI models to complete processing before making a decision as to which AI model output to provide to output decoding 416. As such, when cost and time are not as vital, this mode has the potential of returning the best results.

To make the decision of which AI model output to employ, model selector 414 may combine the overall system performance of each AI model as reported by performance engine 312 with a current result confidence value returned for each task by each AI Model 315A, 315B, 315C. Model selector 414 may also obtain the contextual information as described above for dynamic mode, and determine which AI model 315A, 315B, 315C output to provide to output decoding 416.

Figure 4C:
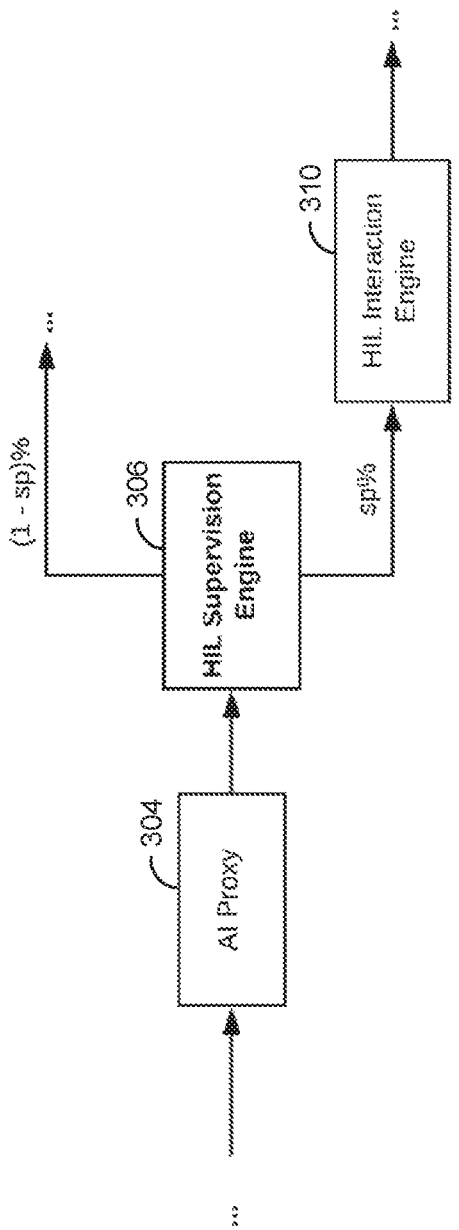

Referring back to FIG. 3, HIL supervision engine 306 obtains the output data from AI proxy engine 304, and routes a percentage of the output data to HIL interaction engine 310, as indicated in FIG. 4C. AI proxy engine 304 provides HIL supervision engine 306 with a task summary (e.g., task summary record), listing information related to corresponding data, such as a corresponding image (e.g., as noted above), and, at least in some examples, specific results collected from an AI model 315A, 315B, 315C. Based on a configuration of AI model management computing device 102 (e.g., as configured by a user), HIL supervision engine 306 may determine the following based on the results received from each AI model 315A, 315B, 315C.

For binary classification workflows, results provided by AI proxy engine 304 can include a Boolean value (e.g., either True or False) and a confidence value associated with the Boolean value (e.g., a value between 0.0 and 1.0, inclusive).

For classification (e.g., multi-class classification) workflows, results provided by AI proxy engine 304 can include a list of classes and a confidence associated with each class (e.g., a value between 0.0 and 1.0, inclusive). The possible list of classes coming as part of each result may have been manually configured in AI model management computing device 102 (e.g., the list of classes for each possible workflow may be obtained from database 116).

For object detection workflows, results provided by AI proxy engine 304 can include a list of object locations, their class, and a confidence associated with each class (e.g., a value between 0.0 and 1.0, inclusive). The possible list of classes coming as part of each result may have been manually configured in AI model management computing device 102 (e.g., the list of classes for each possible workflow may be obtained from database 116).

HIL supervision engine 306 can dynamically adjust a sample size that is routed to HIL interaction engine 310 depending on how an AI Model 315A, 315B, 315C is performing. In some examples, each task will go either to HIL optimization engine 308, or to HIL interaction engine 310, based on a split percentage (sp, as indicated in FIG. 4C).

For example, HIL supervision engine 306 may determine the split percentage (e.g., indicating a percentage of tasks that are to be directed to the HIL interaction engine 310) according to the following:

$$sp = hp\, e^{ln\left(\frac{lp}{hp}\right)p} \qquad \text{(eq. 2)}$$

where:
   p is the performance of the model;
   hp is the percentage that would be sent to the HIL step when the performance of the model is at its lowest; and
   lp is the percentage that would be sent to the HIL step when the performance of the model is at its highest.

A user may configure the values for hp and lp. In some examples, they are set to 1.0 and 0.10, respectively, by default. In this configuration, HIL supervision engine 306 routes 100% of the data (e.g., tasks) to HIL interaction engine 310 when the corresponding (e.g., active) AI model is performing at 0%, but will not route less than 10% of the data to HIL interaction engine 310, even when the corresponding AI model is performing at 100%. This ensures that at least 10% of the data is routed to HIL interaction engine 310 regardless of AI model performance.

Figure 4D:
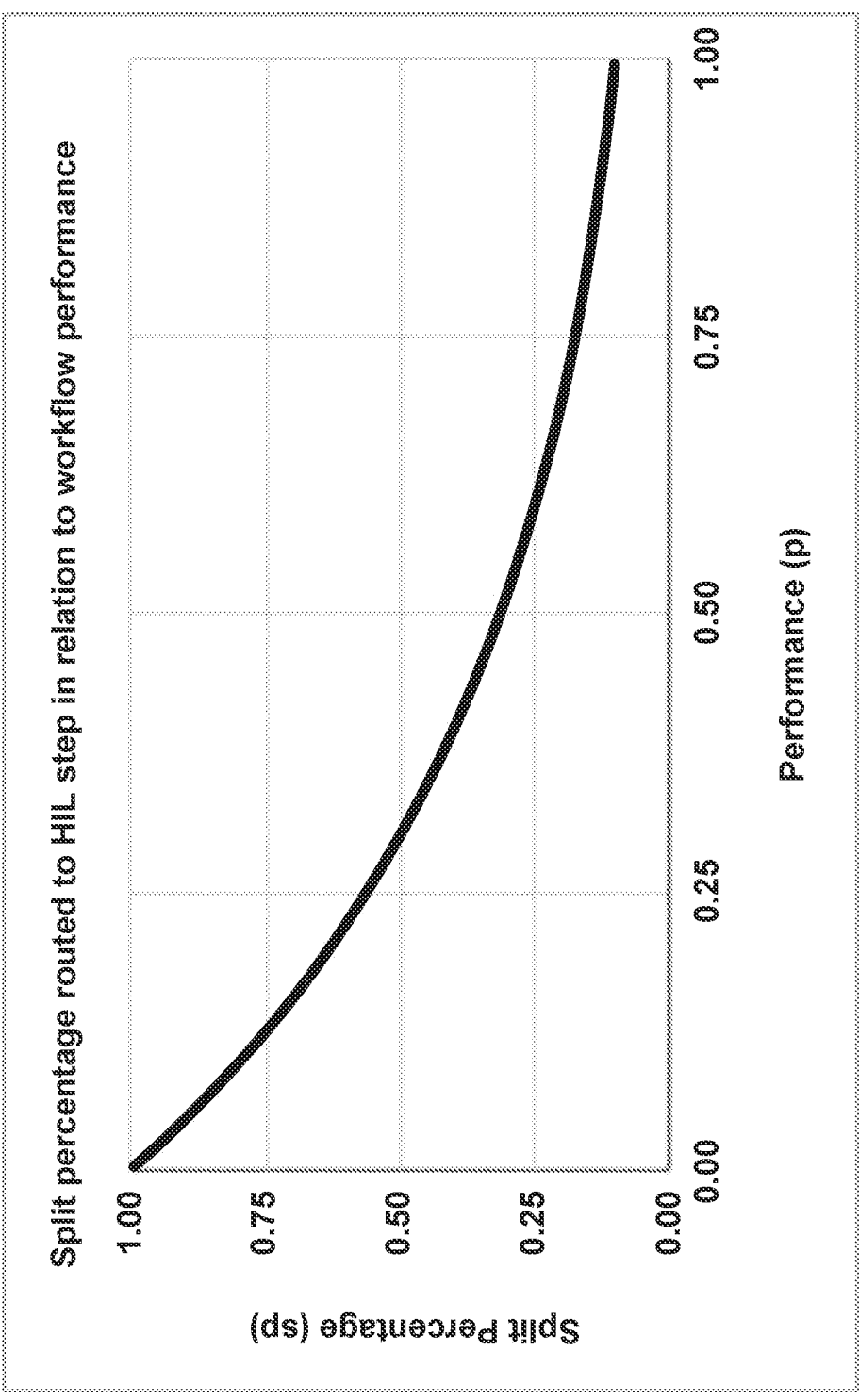
FIG. 4D illustrates an example graph illustrating processing decisions based on performance that may be achieved by the AI model management computing device of FIG. 2 in accordance with some embodiments.

FIG. 4D illustrates an example graph with split percentage on the vertical axis, and performance on the horizontal axis. The graph illustrates an example of how HIL supervision engine 306 may vary split percentage depending on workflow performance (e.g., based on performance data received from performance engine 312).

Referring back to FIG. 3, HIL optimization engine 308 receives data (e.g., 1-sp % of the AI proxy engine 304 output data) from HIL supervision engine 306, and determines whether the data is to be routed to HIL interaction engine 310. HIL optimization engine 308 may determine whether to route the data to HIL interaction engine 310 based on one or more of the following: 1) a confidence of a result obtained from an AI model 315A, 315B, 315C (e.g., a seeded confidence); b) a confidence of the system of a result obtained from an AI model 315A, 315B, 315C (e.g., a system confidence); c) a cost (e.g., calculated, or predetermined) of making a mistake; and d) a cost of human interaction (e.g., a dollar amount).

Seeded Confidence

The seeded confidence represents the confidence of an AI model 315A, 315B, 315C on the provided result. For example, the seeded confidence may be provided by each AI model and can be a value between 0.0 and 1.0, inclusive. The seeded confidence may be included with each task and provided to HIL optimization engine 308. The seeded confidence value represents how confident an AI model is of its own result. For example, each individual class determination included in a result may have its own seeded confidence value.

System Confidence

The system confidence is a dynamically computed value by the HIL optimization engine 308, and represents a confidence on the results returned by an AI model 315A, 315B, 315C (e.g., active AI model). HIL optimization engine 308 computes a system confidence for each individual class included in results obtained from HIL supervision engine 306.

The system confidence and the seeded confidence need not agree. For example, an AI model may return a specific class with a relatively high seeded confidence, but HIL optimization engine 308 may nonetheless determine that, because the AI model hasn't processed enough tasks similar to a current task, the generated system confidence on that result is relatively low.

In some examples, HIL optimization engine 308, to determine the system confidence, may consider the seeded confidence as a factor. One implementation might simply reuse the seeded confidence as the system confidence, for example Another implementation may employ the seeded confidence as a percentage, such as 50%, of an overall value for the system confidence.

In some examples, a similarity approach is used to determine whether results deserve their seeded confidence. For example, HIL optimization engine 308 may determine whether the AI model has processed enough similar tasks before, and determine how the system performed in those cases. If a system is processing a task for the first time, the system confidence in the result may be relatively slow. Similarly, if the system is processing a task that's similar to previous tasks that were determined to have relatively lower system confidences, the system confidence for the instant task may also be relatively low. HIL optimization engine 308 may determine the system confidence in the first case to be higher than the system confidence in the second case, for example. In other words, HIL optimization engine 308 may give greater weight to one seeded confidence than to another seeded confidence based on the execution of a number of previous similar tasks.

To determine previous similar tasks, HIL optimization engine 308 may employ a K-Nearest-Neighbors (KNN) algorithm, or any other suitable algorithm, to determine a cluster of similar tasks processed before by AI model management computing device 102. For example, HIL optimization engine 308 may apply the KNN algorithm to metadata associated with each task, with the metadata serving as input features to the KNN algorithm. From the resultant cluster of similar tasks, HIL optimization engine 308 can determine how a particular AI model responded. For example, HIL optimization engine 308 may determine how the particular model responded to the cluster on average in order to determine how much it should trust the AI model seeded confidence results.

Costs

Another factor that HIL optimization engine 308 may take into account is the cost associated with making a mistake, such as false positives and false negatives, as described above. A user may provide a cost matrix specifying the associated cost to each type of mistake. Similarly, the cost matrix may include a cost associated with asking a human for assistance (e.g., to verify an AI model decision). These values may be used as part of an algorithm (e.g., machine learning algorithm) within the HIL optimization engine 308 to determine whether tasks should be routed to HIL interaction engine 310 or sent to decision engine 316.

To determine whether to route tasks to HIL interaction engine 310 or to decision engine 316, HIL optimization engine 308 may obtain a current task, the above noted cost matrix, a ground-truth dataset (described further below), and one or more user provided rules. HIL optimization engine 308 may also obtain a user-specified value representing a threshold defining the boundaries of similarity between tasks ("minimum_similarity_threshold"); an estimated cost associated with solving a current task using the seeded confidence provided by an AI model ("cost_ai"); and an estimated cost associated with solving the current task if the task is routed to HIL interaction engine 310 ("cost_hil"). For example, cost_ai may be an expected cost of solving a current task without routing the task to HIL interaction engine 310 to request help from humans. Cost_ai may be computed by HIL optimization engine 308 by determining a most likely response (e.g., a response provided by the AI model), a likelihood that the response is wrong (e.g., using a confidence parameter generated by the AI model, or based on a confidence parameter, such as a parameter identifying the system confidence). HIL optimization engine 308 may also determine a cost for the response. For example, HIL optimization engine 308 may compute an expected cost by multiplying a probability of the response being wrong by a cost of being wrong (e.g., the cost of a false positive or the cost of a false negative). The "cost_hil" value can be defined as the cost of solving a task based on the confidence produced by a human answer in addition to the cost of asking a human for assistance, for example. These costs may be predetermined and stored in database 116, for example HIL optimization engine 308 may compare cost_ai with cost_hil to determine if the task is to be routed to HIL interaction engine 310 to request help from humans. For example, if cost_ai is greater than cost_hil, then HIL optimization engine 308 routes the task to HIL interaction engine 310. Otherwise, the task is not routed to HIL interaction engine 310. In some examples, HIL optimization engine 308 also considers whether the task can be completed in time if routed to HIL optimization engine 308. This time sensitivity is discussed in further detail below.

Figure 4E:
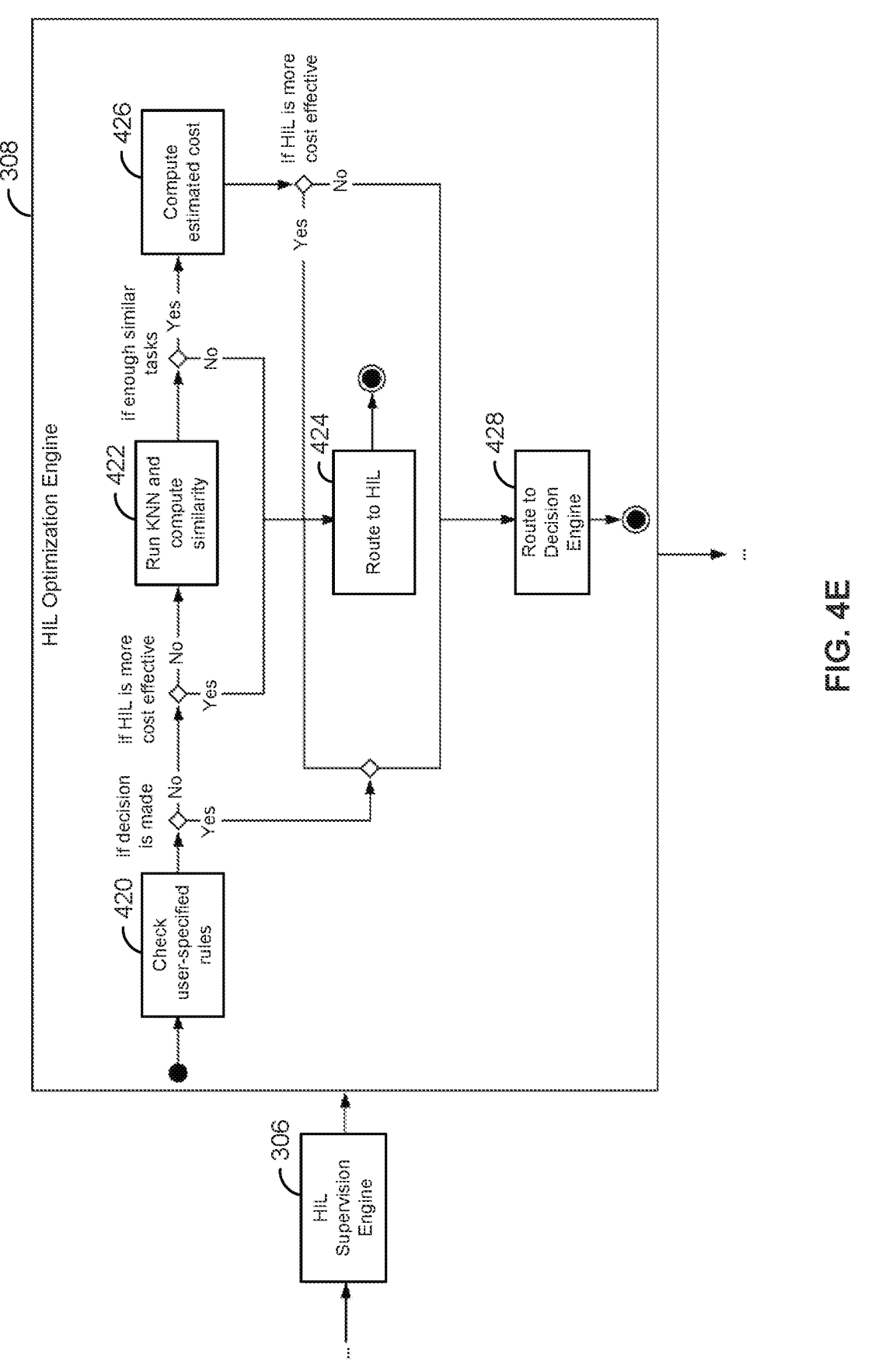
FIGS. 4E-4I illustrate further details of the exemplary portions of the AI model management computing device of FIG. 2 illustrated in FIG. 3 in accordance with some embodiments.

HIL interaction engine 310 may then execute a method (e.g., one or more algorithms), to determine whether to route tasks to HIL interaction engine 310 or to decision engine 316. For example, and with reference to FIG. 4E, HIL interaction engine 310 may execute the following steps:

Step 1: The first step of the algorithm will run a current task through the set of rules specified by the user, as indicated by step 420. These rules may take the form of a Boolean condition with an associated route direction. For example, the user might specify the following rule:

if metadata.time>7 pm:

route to HIL step

By executing this rule, every task with data (e.g., image data) that was taken after 7:00 pm at night will be sent directly to HIL interaction engine 310. User-specified rules will be tried in the order specified, for example, and if no decision is made, the algorithm will continue to the next step.

Step 2: After going through the user-specified rules, and assuming no decision was made, the algorithm may determine whether to ask for human assistance (e.g., help). For example, by executing the below rule, if an estimated cost to make a direct decision by skipping HIL interaction engine 310 processing is more expensive than a cost of asking for human help, the algorithm will route the task to HIL interaction engine 310, as indicated by step 424.

if cost_ai>cost_hil:

route to HIL step

Step 3: If the cost of asking for human help is greater than an estimated cost of providing the answer returned by the AI model, the algorithm may compute the system confidence associated to the task in accordance with step 422 and the following:

a) Run KNN algorithm to determine a set of the N most similar tasks on the ground-truth dataset.

b) Compute similarity value, defined as the weighted similarity of those N neighbors (similar tasks) returned by the KNN algorithm.

c) If the KNN algorithm is not able to return enough similar tasks (as defined by the provided minimum_similarity_threshold), the system hasn't processed enough similar tasks, thus the seeded confidence shouldn't be trusted and the task should be routed to HIL interaction engine 310:

if similarity<minimum_similarity_threshold: route to HIL step

Step 4: If the system has processed enough similar tasks in the past, it can use past performance on those tasks to predict future performance in accordance with step 426 and the following:

a) Compute the estimated performance, defined as the weighted performance score of those neighbors. This value represents how the AI model performed when those neighbor tasks were processed.

b) Compute the estimated cost, defined by the probable cost of routing the current task to decision engine 316 when taking into account the estimated performance and the cost matrix.

c) If the estimated cost of routing the task to decision engine 316 is still greater than asking for help, then we route the task to HIL interaction engine 310:

if estimated_cost>cost_hil: route to HIL step

Step 5: Route the task directly to decision engine 316 in accordance with step 428.

Referring back to FIG. 3, HIL interaction engine 310 may obtain results from one or more of HIL supervision engine 306 and HIL optimization engine 308. HIL interaction engine 310 may also manage and facilitate human assistance (e.g., verification) as part of an overall solution. As such, HIL interaction engine 310 provides an additional layer of intelligence on top of the AI Model, capturing ground-truth data and validating and/or correcting results provided by the AI Model.

HIL interaction engine 310 may operate in classification mode, or in object detection mode (e.g., when input data is image data), which may be configured by a user. In classification mode, tasks consist of providing one or more classifications for each task, whereas in object detection mode, tasks consist of detecting all the different instances of relevant objects present on each input image. In both modes, workflow configuration module 313 (which may identify configuration settings, costs, cost matrices, workflow settings, user settings, time sensitivities (discussed further below), etc., and may be stored in database 116) provides a list of possible classes that will be used by HIL interaction engine 310 to validate and correct the results from AI models 315A, 315B, 315C.

Regardless of the mode, HIL interaction engine 310 may execute (via, e.g., the execution of one or more algorithms) a confirmation step, and a correction step. For the confirmation step, HIL interaction engine 310 allows humans (e.g., via input/output device 203) to confirm whether the result from an AI Model is correct. During the correction step, HIL interaction engine 310 allows allow humans to provide a correct response (e.g., a correct classification, object detection, etc.).

When configuring a workflow, one or more teams are assigned to HIL interaction engine 310 (e.g., as indicated by workflow configuration module 313). Humans assigned to these teams will be responsible for performing the tasks generated by HIL interaction engine 310. HIL interaction engine 310 may organize human verification requests, which are requests for human verification and/or correction, based on how many people are assigned to each team, as well as a computed confidence of getting an accurate answer from each team. For example, HIL interaction engine 310 may operate in 3-people consensus (3 PC) mode or in 1-person answer (1PC) mode. In 3PC mode, each human verification request will have to be answered by three different people for the task to continue. In 1PC mode, each human verification request will require a single response for the task to continue.

Figure 4F:
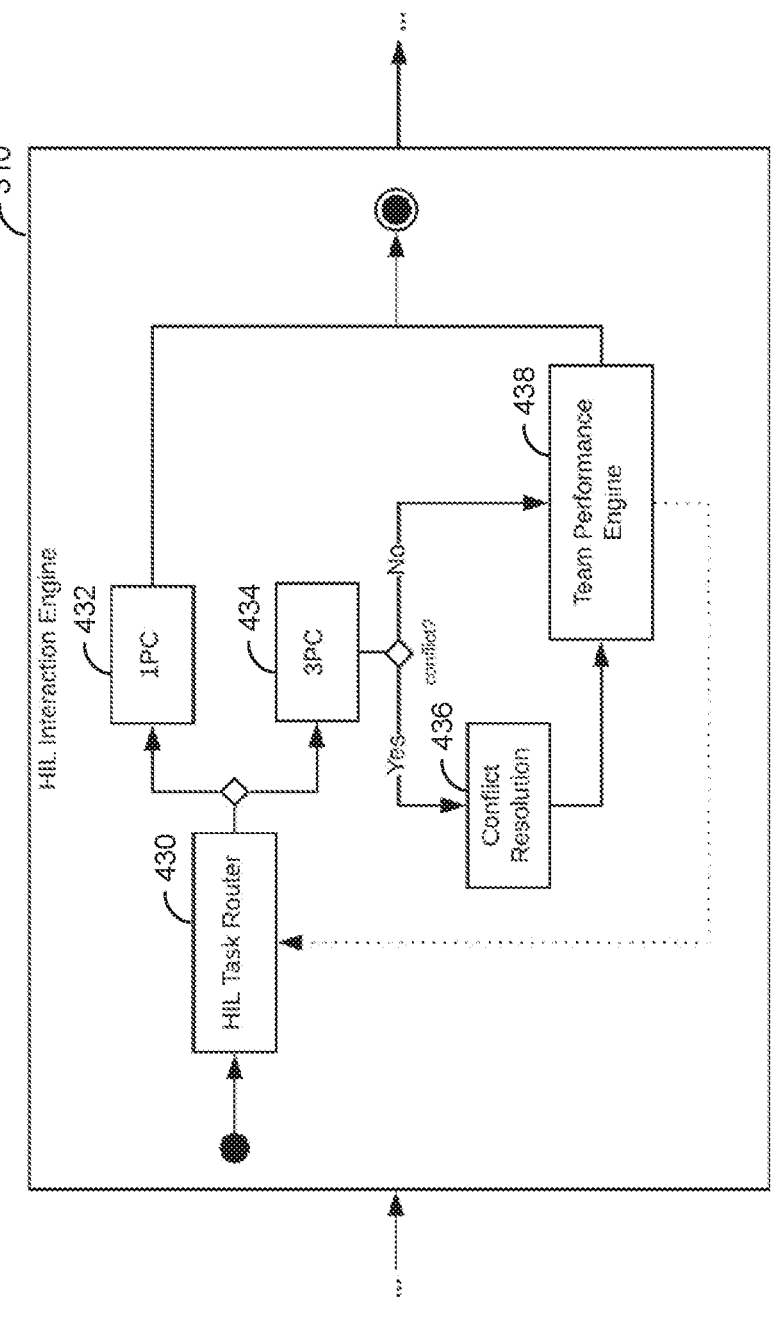

FIG. 4F illustrates an example of exemplary portions HIL interaction engine 310. As illustrated, HIL interaction engine 310 may include HIL task router 430, 1-person consensus module 432, 3-person consensus module 434, conflict resolution module 436, and team performance engine 438. Although the below examples illustrate 1-person and 3-person consensus examples, in other examples, a consensus of a different number of people may be employed (e.g., required).

3-People Consensus

In some examples, HIL interaction engine 310 is configured in 3-People Consensus (3PC) mode by default to determine a ground-truth value (e.g., to ensure a high level of confidence and consensus, from 3 separate human individuals (in this example), in ground truth values) for a task. In this mode, HIL task router 430 routes tasks to 3PC module 434, which determines three different human responses for each task. When a task is provided to 3PC module 434, there are two different possibilities:

1) All human answers match. In this case, the ground-truth may be the answer given by everyone, and the task will move forward to the next step of the workflow.

2) At least one of the answers do no match with another answer, which results in a conflict. In this case, conflict resolution module 436 assigns the task to "a leader" for final validation. The leader has the opportunity to see how all three people answered, and provide a final, ground-truth answer that is used by HIL interaction engine 310 to move the task forward to the next step of the workflow.

A leader may be any member of a team, for example A user may determine the leader during configuration of AI model management computing device 102, and may be identified by workflow configuration module 313. On each team, there may be more than one leader specified. In some examples, if there is no leader specified, conflict resolution module 436 automatically determines the leader to resolve conflicts to be the person with the best accuracy from all the assigned teams. If there is more than one leader available, or more than one person with the same accuracy if no leader is available, HIL interaction engine 310 assigns the task to the person that maximizes the likelihood of getting an answer as fast as possible (described further below).

3PC module 434 may compute a confidence value for each human response (e.g., human answer) based on an individual accuracy of each person involved in answering the task. If consensus is reached (all three answers are the same), the confidence of the answer may be computed, for example, according to the following:

$$confidence = 1-(1-pa_1)(1-pa_2)(1-pa_3) \qquad \text{(eq. 3)}$$

where:

$pa_1$ represents the accuracy of the first person to provide an answer for the task;

$pa_2$ represents the accuracy of the second person to provide an answer for the task; and $pa_3$ represents the accuracy of the third person to provide an answer for the task.

As such, each person contributes to the confidence of the answer proportionally to their individual accuracy. If consensus is not reached (e.g., one or more of the answers are not the same), the confidence may be computed according to the following:

$$confidence = la \qquad \text{(eq. 4)}$$

where:

la represents the accuracy of the leader that provided an answer for the task.

In this example, if consensus is not reached, a leader is selected to intervene and provide a final, definitive answer. In this case, 3PC module 434 may use the accuracy of the leader as the determined confidence for the answer.

1-Person Answer

In some examples, HIL interaction engine 310 is configured in 1-Person Answer (1PC) mode to determine the ground-truth value for a task. If, for example, the number of people assigned or available is less than three, HIL interaction engine 310 operates in 1PC mode to determine the ground-truth for the task. In this mode, HIL task router 430 routes tasks to 1PC module 432, which obtains a single answer for each task. Operating in 1PC mode may allow HIL interaction engine 310 to determine ground-truth values more quickly than when operating in 3PC mode. The confidence of an answer to a task may be computed by 1PC module 432 based on the computed individual accuracy of the person who provides the answer. For example, the confidence of an answer may be computed according to the following:

$$\text{confidence} = pa \qquad \text{(eq. 4)}$$

where:

pa represents the accuracy of the person that provided an answer for the task.

Dynamic Switching Between 3PC and 1PC Modes

Although operating in 3PC mode may provide more confident answers on average, it may also be more time consuming and, in some examples, more expensive, than operating in 1PC mode. For example, operating in 3PC mode may be more wasteful assuming the confidence of a final answer doesn't degrade, or any degradation in the final answer isn't costly above some minimum threshold to the customer. HIL task router 430 is configured to determine whether confidence values provided in 3PC mode are worth the additional costs (e.g., time, wages) as compared to operating in 1PC mode.

For example, HIL task router 430 may determine whether to route tasks to 1PC module 432 or 3PC module 434 based on one or more of the following: 1) metadata; 2) input data features (e.g., image features); 3) responses provided by the AI model (e.g., classes and confidence scores); 4) average accuracy of the people that would be answering the task; and 5) costs associated with making a mistake (e.g., costs of false positives and false negatives).

HIL task router 430 may generate confidence data indicating an expected confidence (e.g., confidence value) of operating in 3PC mode, and an expected confidence of operating in 1PC mode. In some examples, HIL task router 430 applies one or more machine learning algorithms to one or more of the above-noted features to generate the confidence data. Based on the expected confidences of operating in 3PC mode and 1PC mode, HIL task router 430 determines whether to route tasks to 1PC module 432 or 3PC module 434. HIL task router 430 may vary the operating mode (i.e., 3PC mode vs. 1PC mode) in real-time (e.g., as tasks are being processed), for example.

Ground-Truth Generation

As noted above, HIL interaction engine 310 may generate ground-truth values for a task (which may be provided as ground-truth datasets). The ground-truth values may be used to further train AI model 315 (e.g., in real-time).

To generate the ground-truth values, HIL interaction engine 310 may receive results from the HIL supervision engine 306 and/or from the HIL optimization engine 308. In some examples, the number of samples received is inversely proportional to the performance of an AI model. For example, the better the model is performing (e.g., as indicated by performance data received from performance engine 312), the fewer samples are sent to HIL interaction engine 310. On the other hand, if the performance worsens, the more samples are sent to HIL interaction engine 310.

To generate a ground-truth value, each sample (e.g., AI model result) sent to HIL interaction engine 310 requires confirmation or correction of the sample. The ground-truth value is based on the confirmation or correction of the sample. The ground-truth value may be stored in a table (e.g., in database 116), along with the original AI model request, and, in some examples, a timestamp on when the request was generated (e.g., date and time). These stored ground-truth values may be used during the Continuous Learning process described below.

In some examples, HIL interaction engine 310 assures that duplicate data (e.g., ground-truth values) are not recorded. For example, HIL interaction engine 310 may receive duplicate tasks (e.g., for example, through the creation of Shadow Tasks, as described below). Despite this, HIL interaction engine 310 ensures that recorded ground-truth values are unique, as further explained below.

Computing the Accuracy of a Team Member

Team performance engine 438 may determine the accuracy of every person involved with a task. For example, HIL interaction engine 310 may operate in 3PC mode to verify answers given by each person assigned to a team associated with a task.

Each person may start with a configured default accuracy. If not manually specified, the default accuracy may be set to 100%, for example. As more data is collected, team performance engine 438 may begin to give more weight to computed accuracy values. For example, team performance engine 438 may compute accuracy values according to the following:

$$a = (1 - \gamma)ba + \gamma pa \qquad \text{(eq. 5)}$$

$$\gamma = \min(k/n, 1.0) \qquad \text{(eq. 6)}$$

where:

ba represents the baseline accuracy configured for this person at the time of setting up the workflow;

pa represents the computed accuracy for this person;

k is the number of tasks that have been routed so far to the conflict resolution step, thus representing the total number of ground-truth values that can currently be used to compute the accuracy of this person;

n represents the total number of tasks needed before completely shifting the accuracy from the baseline value to the computed accuracy.

If there's a conflict when operating in 3PC mode, for example, team performance engine 438 will determine the computed accuracy for a person's answer based on the designated leader's answer being ground-truth. If there's no conflict, the answer provided by each person will be considered ground-truth and will be recorded as correct. Every time a new task is routed to 3PC module 434, the accuracy of every person involved in that task is updated.

Exemplary Use Case: Classification Mode

When the workflow (e.g., AI Model 315) is configured to run in Classification mode, each task may be tagged with one or more classes by the AI Model 315. The HIL interaction engine 310 may present these classes to a designated team (e.g., one or more persons) during a Confirmation Step to confirm whether the result is correct. For example, HIL interaction engine 310 may present the results on a user interface, such as user interface 205 displayed on display 206, to each person on the designated team for the current workflow. User interface 205 may allow each person to confirm, or correct, each result.

If the human involved confirms the AI model 315 result, HIL interaction engine 310 selects a next task (e.g., from a queue) to repeat this process. If the person involved indicates that the result is not correct, HIL interaction engine 310 enters the Correction Step where a list of relevant classifications is displayed for the person to select a correct answer.

Based on the selection, HIL interaction engine 310 corrects the task, and may select a next task to repeat the same process.

A special case for Classification mode is when the workflow is configured for binary classification. In that case, the Confirmation and Correction steps can be combined into a single selection for the person to select whether the AI Model 315 result is correct or not, where an alternative answer (e.g., classification) is automatically determined if the user selects that the result is not correct.

Exemplary Use Case: Object Detection Mode

When a workflow is configured to run in Object Detection mode, each task processed by AI Model 315 may return a list of classes of the relevant objects detected, their coordinates, and/or their box dimensions, for example HIL interaction engine 310 may present these results to each team member during the Confirmation Step to confirm whether they are correct.

If the person involved confirms the AI model 315 result, HIL interaction engine 310 selects the next task and starts the process again. If the person involved indicates that the result is not correct, HIL interaction engine 310 enters the Correction Step where HIL interaction engine 310 displays to the person a user interface, such as user interface 205, where the person is able to change the class of an object, remove an object, or even create new objects, for example After the task is corrected, HIL interaction engine 310 selects the next task and starts the process again.

Task Prioritization

In some examples, HIL interaction engine 310 can access a prioritized list of available tasks (e.g., as provided by workflow configuration module 313, stored in database 116). The tasks may be divided into two different groups:

1) Pending tasks to complete a workflow: These are tasks that are waiting for an answer (e.g., human answer) before being able to continue moving through the workflow. Until a task on this list is resolved, the workflow cannot complete.

2) Shadow tasks: These are tasks whose purpose is to augment available ground-truth data. These tasks don't need to be completed and, in some examples, are lowest priority for HIL interaction engine 310. Shadow tasks are described in further detail below.

In some examples, the list of pending tasks is sorted based on their time-sensitivity. HIL interaction engine 310 may, in some examples, always select the remaining task with the highest priority.

Tasks assigned to individual people will also be subject to the overall prioritization of tasks. For instance, regardless of the individual task list of a person, a time-sensitive task out of that list (not assigned to anyone in particular) may be prioritized (e.g., over everything else) if that person comes online (e.g., becomes available to verify AI model results). In some examples, HIL interaction engine 310 allows only a person assigned to a task to complete that task, regardless of the task's time sensitivity. For example, when a person assigned to a task is a leader selected to solve a conflict in a multi-person consensus validation scenario, only that person may be allowed to solve the conflict.

Referring back to FIG. 3, decision engine 316 may receive output data from one or more of HIL optimization engine 308 and HIL interaction engine 310. Decision engine 310 processes the received output data to determine one or more actions that are to be taken, which may be user-defined (e.g., as provided by workflow configuration module 313). For example, a user may select, via user interface 205, one or more actions for each task of a workflow. Decision engine 310 maps each task with its corresponding one or more actions.

Figure 4G:
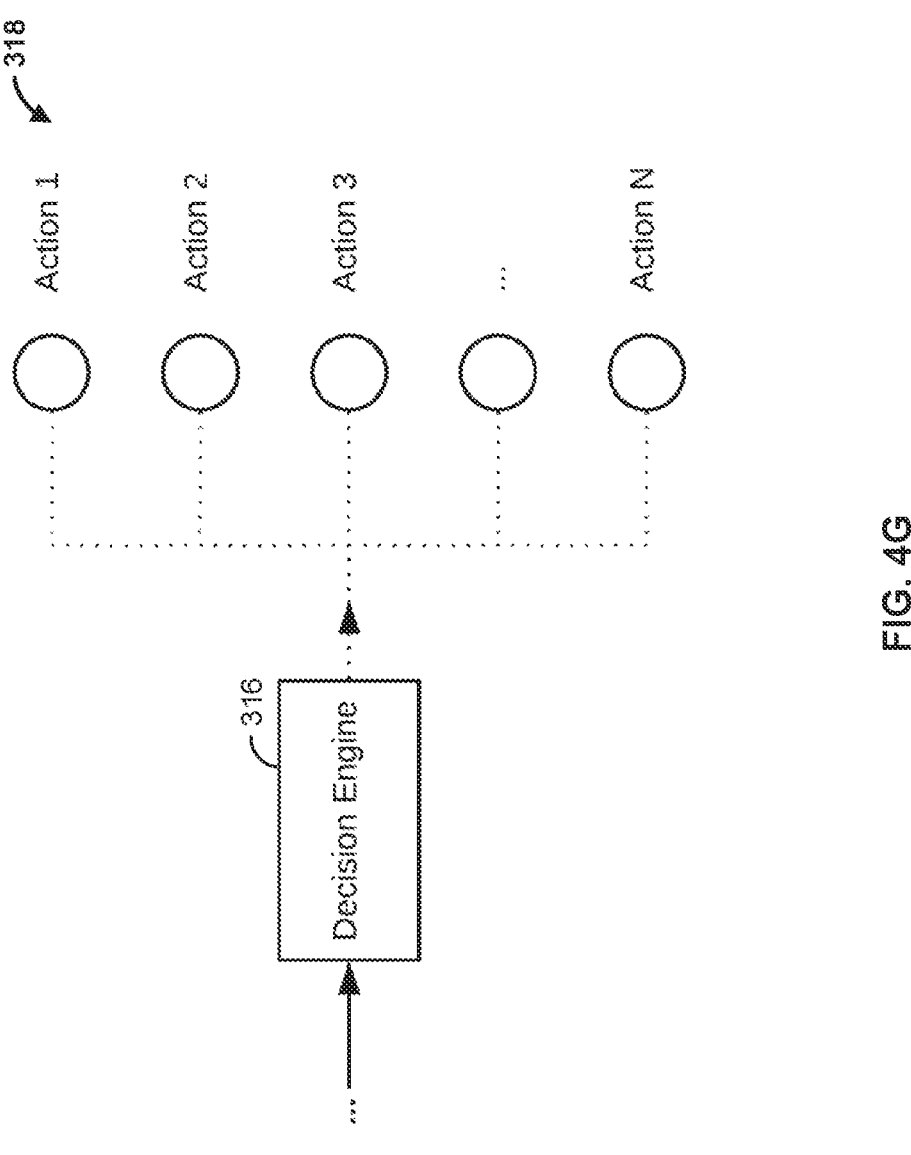

For example, FIG. 4G illustrates a plurality of actions 318 that decision engine 36 may determine for a given task in a workflow. In some examples, actions are "push" actions, e.g., sending information to specified third-party endpoints. Some examples include: 1) sending information in an electronic mail (email) message; 2) send a short message service (SMS) (e.g., text) message; and sending a current task summary to an HTTP endpoint.

Decision engine 316 may decide what action 318 to take based on the confidence values associated with a task. For example, decision engine 316 may determine the action 318 to take based on:

1) HIL confidence: confidence computed by HIL interaction engine 310;
2) System confidence: confidence computed by HIL optimization engine 308;
3) Seeded confidence: confidence generated by AI model 315 for each result associated with a task.

Depending on a path taken by a task, at least one of the above confidence values is available to decision engine 316. In some examples, decision engine 316 determines the action 318 to take based on a range of confidence values. For example, if a confidence value (e.g., seeded confidence value) falls within a first confidence range (e.g., 90-100, inclusive), decision engine 316 takes a first action. If the confidence value falls within a second confidence range (e.g., 60-89, inclusive), decision engine 316 takes a second action. Otherwise, if the confidence value does not fall within any of the first and second confidence ranges, decision engine 316 may take a third action. A user may specify the specific confidence ranges and related actions as part of the configuration of the workflow (e.g., provided by workflow configuration module 313).

Referring back to FIG. 3, AI model management computing device 102 includes a continuous learning module 314 that improves AI model 315 decisions (e.g., classifications, object detections) based on ground-truth data generated by HIL interaction engine 310. For example, continuous learning module 314 may allow for automatic training and deployment of new versions of the AI model 315 as AI model management computing device 102 processes more data.

Continuous learning module 314 may operate in one of several levels of autonomy, as described below:

Level 1: Includes the collection and preparation of a ready-to-use dataset of ground-truth data for use in training (e.g., future training) of AI model 315.

Level 2: Allows for automatically training and validating a new version of AI model 315 as a specific ground-truth dataset size is reached. The new version of AI model 315 may be stored, for example in database 116. The new version of AI model 315 may be available for use in a future workflow, for example, as configured by a user.

Level 3: In addition to level 2 functionality, at this level continuous learning module 314 can automatically deploy the new version of AI model 315. In some examples, a human (e.g., a data scientist) must specify that the new version may be deployed. For example, the human may configure the new version in AI model management computing device 102 for deployment.

Level 4: In addition to level 3 functionality, at this level continuous learning module 314 can automatically deploy the new version of AI model 315 when the performance of the new version is better than the performance of an active version of the AI model 315. In some examples, continuous learning module 314 determines whether a new version of AI model 315 is performing better than a current version based on user provided performance metrics. For example, continuous learning module 314 can dynamically make a decision to switch from a current version of the AI model to a new version of the AI model based on how the models are performing with regards to the supplied performance metrics (e.g., system performance metric).

Figure 4H:
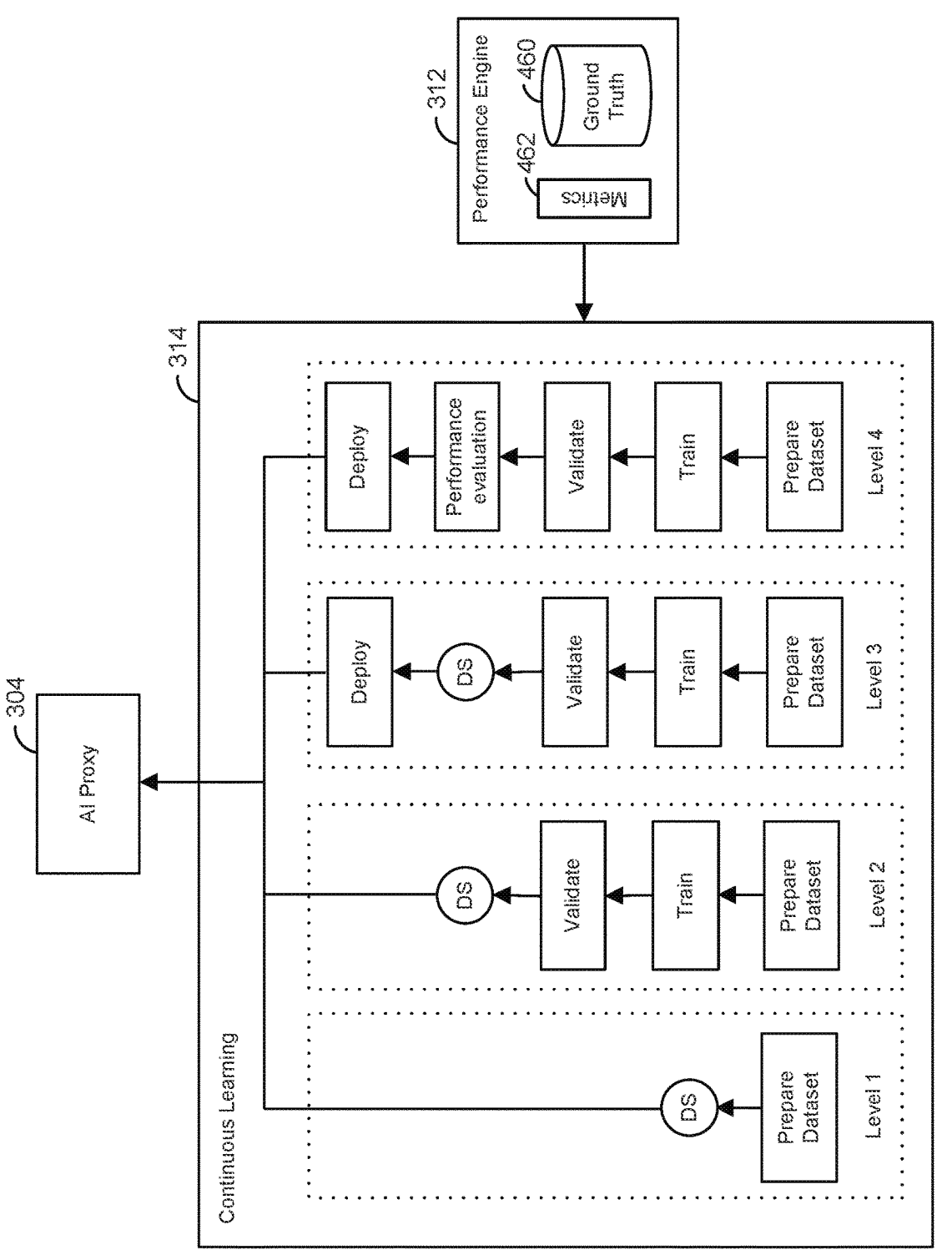

FIG. 4H illustrates example steps that continuous learning module 314 may execute for each autonomous level, where "DS" identifies a human (e.g., data scientist). Further details of each level are described below.

Level 1 Autonomy

Continuous learning module 314 may receive ground-truth values from HIL interaction engine 310 (e.g., via performance engine 312), and may format the data. The data may be stored, for example, in database 116. For example, for object detection tasks, continuous learning module 314 may provide a dataset with PascalVOC annotations, which may be ready to use for training of other (e.g., new) versions of AI model 315.

Level 1 autonomy may be engaged when training an AI model is a hard-to-automate activity such as, for example, with ensemble models that consist of more than one individual AI model glued together. Level 1 may also be engaged when hardware or software needed to train a specific AI model 315 is not currently provided by AI model management computing device 102.

Level 2 Autonomy

Level 2 autonomy allows for the automatic training and validating of a new version of AI model 315. Data identifying training and validating results may be stored in database 116, for later examination, for example Level 2 autonomy may be engaged when deploying the AI model is a hard-to-automate activity, or when the AI model should first be deployed outside of the system (e.g., as for further testing). In either case, a human (e.g., data scientist) may decide whether the new version of the model should be deployed based on the training and validating results and, if so, may carry out the deployment process.

Level 3 Autonomy

If the deployment of a new version of the AI model can be automated, Level 3 autonomy may be implemented. In this case, continuous learning module 314 may train and validate a new version of the AI model, and it may require a confirmation from a human (e.g., data scientist) to automatically deploy the model. Level 3 may be necessary when the system is not able to determine, without further input (e.g., as from a data scientist), whether the new version of the AI model is better than a currently active version.

Level 4 Autonomy

This level allows for automatic training, validation, and deployment of new versions of AI models as new ground-truth data is generated. At this level of autonomy, no human (e.g., data scientist) is needed for AI model deployment. Different use cases may require different performance metrics to allow continuous learning module 314 to determine whether a specific version is better than another. A user may provide the performance metrics to measure and, in some examples, may provide an algorithm to be used to determine the performance of each version of an AI model (via, e.g., workflow configuration module 313).

Model Deployment

As noted above, level 3 and level 4 autonomy include the automatic deployment of a new version of the AI model. The system may allow the user to configure different options to perform the deployment, including a transitional mode, a dynamic mode, and a parallel mode.

1. Transitional Mode: This may be the default option, and instructs the system to deploy a new version of the AI model alongside the existing version, and transition all the traffic over time to the new instance. (See above for further description regarding transitional mode).

2. Dynamic Mode: In this mode, the new version of the AI model is deployed alongside the existing one, and the system will decide how to route traffic through each version depending on system performance. (See above for further description regarding dynamic mode).

3. Parallel Mode: In this mode, the new version of the AI model will be deployed alongside the existing one, and the system will route traffic through every existing version of the model, deciding later which result to use based on the system performance. (See above for further description regarding parallel mode).

Figure 4I:
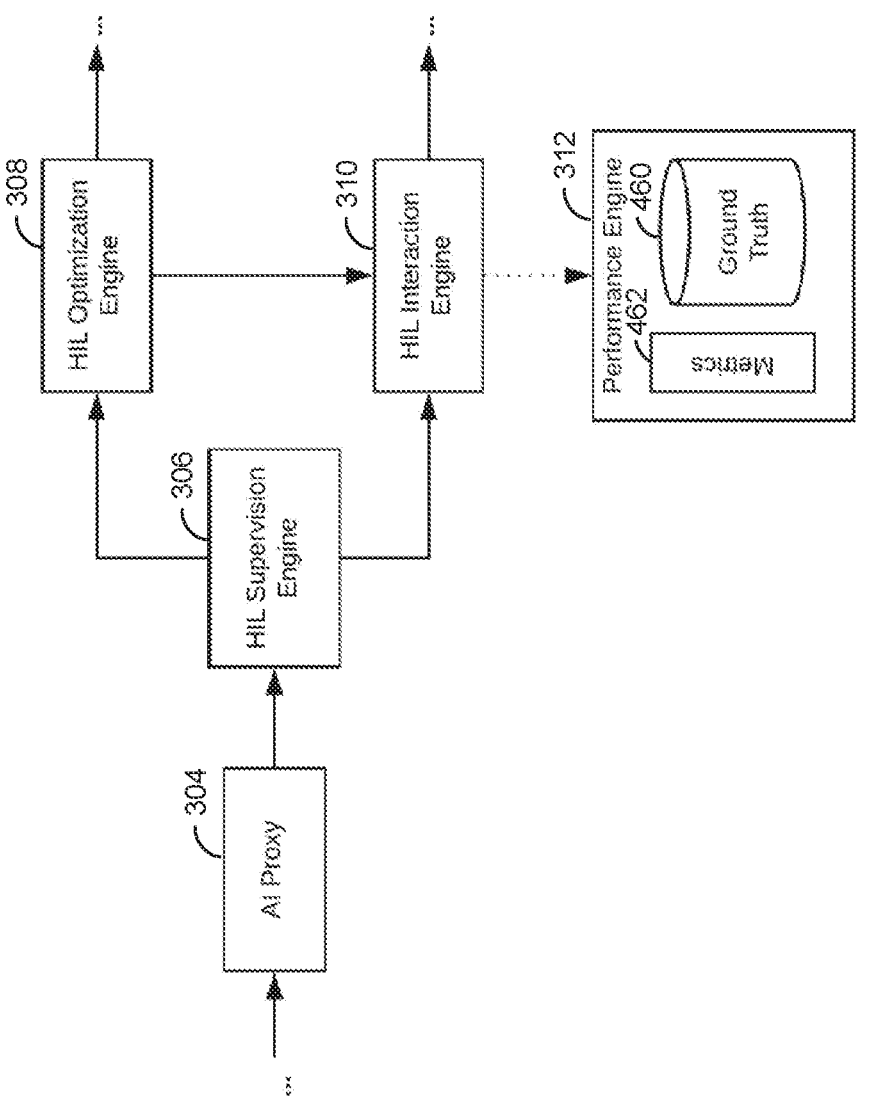

As described above, HIL supervision engine 306 routes images to HIL interaction engine 316, which allows performance engine 312 to compute performance data by comparing the results from an AI Model 315 with ground-truth values provided by HIL interaction engine 316. Referring back to FIG. 4I, performance engine 312 may store ground-truth data 460 and performance metrics data 462.

Initially, when first setting up a workflow and until the workflow has processed enough tasks, HIL interaction engine 316 uses a baseline value to accurately report the performance of a current solution. Over time, as more data is processed, the reported performance can gradually shift from the initial baseline value to the actual computed performance. This avoids natural swings in the reported performance when the amount of data processed is not enough to provide a steady representation of system performance.

An initial baseline performance may be configured at the time of workflow set up (e.g., via workflow configuration module 313) and, in some examples, may be based on a measured performance during the development of the AI model (e.g., a measured accuracy during AI model validation). In some examples, a user may configure the baseline performance via, for example, user interface 205.

Performance engine 312 may compute system performance using similar criteria followed by the baseline performance, as described above. For example, performance engine 312 may receive the results of AI model 315, and receive ground-truth values from HIL interaction engine 310. Performance engine 312 may compute an over performance of the system based on the results of AI model 315 and the received ground-truth values. For example, performance engine 312 may compute the system performance according to the following:

$$p=(1-\gamma)bp+\gamma pp \qquad \text{(eq. 7)}$$

$$\gamma=\min(k/n,1.0) \qquad \text{(eq. 8)}$$

where:

bp represents the baseline performance entered at the time of setting up the workflow;

wp represents the computed workflow performance;

k is the number of tasks that have been routed so far to HIL interaction engine 310, thus representing the total number of ground-truth values that can currently be used to compute the workflow performance;

n represents the total number of tasks needed before completely shifting the reported performance from the baseline value to the computed workflow performance.

The above equation 7 combines the baseline performance (bp) with the workflow performance (wp) according to the number of processed samples (k) and an arbitrary (e.g., configurable) total number of samples (n). The closer k gets to n, the less emphasis is put on the baseline performance and the more trust is put on the workflow performance.

Time Sensitivity

AI model management computing device 102 may, in some examples, dynamically adjust its behavior depending on how much time is needed to process each task. For example, each task may be associated with a deadline attribute identifying a deadline by which the associated task needs to be completed (e.g., a maximum processing time, a specified date, in the same day, etc.). AI model management computing device 102 may update the deadline attribute (e.g., a maximum processing time may be increased or decreased) as more information about a task becomes available. For each task, AI model management computing device 102 computes an expected wait time for task completion (e.g., the addition of how long will each process in the workflow is expected to take). In some examples, the expected wait times are preconfigured (e.g., provided via workflow configuration module 313). Based on the deadline attribute associated with each task and the expected wait time for the task, AI model management computing device 102 makes decisions along the workflow to ensure that the task is completed by the deadline.

Task Deadline

In some examples, a task that's processed by the workflow will be associated with a deadline. The deadline may be received, for example, from workflow configuration module 313. For example, a user may configure a maximum time allowed for each task to be completed by. In some examples, there may be no deadline requirement (e.g., deadline is infinity). This may be the case, for example, if no deadline requirement is received (e.g., by default). If a maximum time is specified, AI model management computing device 102 may compute a deadline associated with each task. For example, when a task is received, AI model management computing device 102 may compute its deadline by adding a current time to the maximum time specified.

Expected Wait Time

In some examples, AI model management computing device 102 may maintain an estimate (e.g., updated estimate) of a wait time at each step (e.g., processing time through a module or engine, such as AI proxy engine 304, HIL supervision engine 306, HIL interaction engine 310, HIL optimization engine 308, Decision engine 316, etc.) in the workflow. This wait time may specify how long it may take for a task to move forward through the step. Each time a new task is received at a step, it may be time-stamped for that specific step. This represents the entry time of the task on that particular step. Each time a task finishes the workflow, the task may be time-stamped, representing an exit time for that task from the entire workflow. For each task that completes the workflow, AI model management computing device 102 may compute the actual wait time for each step the task proceeded through, and may update each step's expected wait time based on the actual wait times. The expected wait time for each step may be computed as, for example, the final timestamp minus the step's entry timestamp. During the processing of the workflow, a task may proceed through one or more of the following steps, with each step taking a minimum of amount of time:

1) AI proxy engine 304: Depending on how AI model management computing device 102 is configured, there may be different sub-steps within AI proxy engine 304. For example, a task might go through model router 412, then an AI model 315A, and then model selector 414. A different workflow might force tasks to go through several AI model versions at the same time in addition to model router 412 and model selector 414. A completion time for this step may vary and depend on an inference time of each AI model. In some examples, the completion time through this step is within 0 to 180 seconds per task.

2) HIL Supervision Engine 306: In some examples, the completion time for this step may be within 0 to 1 second.

3) Decision Engine 316: In some examples, the completion time for this step may be within 0 to 1 second.

Routing Task Data to HIL Interaction Engine with Time Sensitivity

When AI model management computing device 102 routes a task to HIL interaction engine 310 from any of the functions in the workflow, it will take into account the deadline and expected wait times to determine how to proceed. AI model management computing device 102 may have two possible choices to make: 1) route the task to HIL interaction engine 310, setting a time limit to receive a response; and 2) route the task down the alternate path to HIL optimization engine 308 at the same time it sends a shadow copy of the task to HIL interaction engine 310.

When there's enough time available to route a task to HIL interaction engine 310, AI model management computing device 102 may proceed with this option, and assuring the task is prioritized appropriately to maximize the likelihood an answer is received within the allotted time (e.g., the deadline). The task may be submitted to HIL interaction engine 310 containing a specific time limit (e.g., deadline), after which AI model management computing device 102 may, in some examples, turn the task into a Shadow Task (described further below) and proceed to submit the original request to HIL optimization engine 308.

If there's not enough time for AI model management computing device 102 to wait for an answer from HIL interaction engine 310 (e.g., whenever the computed time limit is less than a minimum reasonable amount of time for HIL interaction engine 310 to complete processing), AI model management computing device 102 may generate a Shadow Task (e.g., based on the original task) and send it to HIL interaction engine 310. In some examples, AI model management computing device 102 will also route the task to HIL optimization engine 308.

Shadow Tasks

Shadow Tasks are an exact copy of the original task, but they don't move forward after recording an answer from HIL interaction engine 310. The goal of a Shadow Task is to keep the HIL interaction engine 310 engaged regardless of the time-sensitivity of a required answer. Shadow Tasks, for example, do not have deadlines, and are not prioritized over time-sensitive tasks.

There exists a possibility that a task is submitted to HIL interaction engine 310 at the same time a Shadow Task of it already exists. This may happen, for example, when a Shadow Task is generated from an earlier task submission to HIL interaction engine 310. When this happens, AI model management computing device 102 may execute the following. If the Shadow Task was already answered, that answer will be used as the answer for the newly submitted task. Only one of these tasks will be recorded as ground-truth (thus avoiding duplicate data). If the Shadow Task hasn't been answered yet, AI model management computing device 102 may cancel it and may proceed (e.g., as expected) with the newly submitted task.

For example, AI model management computing device 102 may operate in a mode where a task is submitted to HIL interaction engine 310 for processing and the system waits for a human response. If no response is received within a specified task deadline, a determination is made as to the correct response and is forwarded to decision engine 316. For example, a task may have a 24 hour deadline. The task may be forwarded to HIL interaction engine 310 and the system may wait (e.g., up to 24 hours) for a response. If no response is received in that timeframe, a best guess of the response is determined, and the response is forwarded to the decision engine. A best guess of the response may be based on, for example, previous similar decisions made by HIL interaction engine 310. In some examples, a best guess is determined based on applying one or more machine learning algorithms to data identifying one or more properties of the task. The machine learning algorithms may have been trained, for example, on data (e.g., supervised data) identifying properties of previous tasks.

Time Limits

When a time-sensitive task is routed to HIL interaction engine 310, a time limit will be computed so that AI model management computing device 102 may pull the task back when an answer is not received during that period. In some examples, when the time limit is reached, a Shadow Task is created from the original task, and the control will be returned to the step that sent the task to HIL interaction engine 310 to re-route the task. The time limit for each task may be computed according to the following:

$$t=(1-p)(l-(1+p)wt) \tag{eq. 9}$$

where:

l represents the time left to reach the deadline associated with the task;

wt represents the wait time from taking the alternate path (the path that doesn't lead to the HIL step);

p is a percentage.

Using this algorithm, AI model management computing device 102 keeps a double buffer of p % to ensure it doesn't wait too long for an answer from HIL interaction engine 310. In this example, the algorithm assumes the expected wait time for the alternate path will take p % longer than reported. It also tries to maximize the chances of meeting the deadline by giving p % less time to HIL interaction engine 310 than what the time limit based on expected wait times indicates. These buffers are dynamically adjustable based on a time sensitivity an answer from HIL interaction engine 310 (e.g., how critical is it to receive an answer within the deadline). The amount of the buffer (i.e., p) can be configured by a user and received via workflow configuration module 313, for example.

Figure 5:
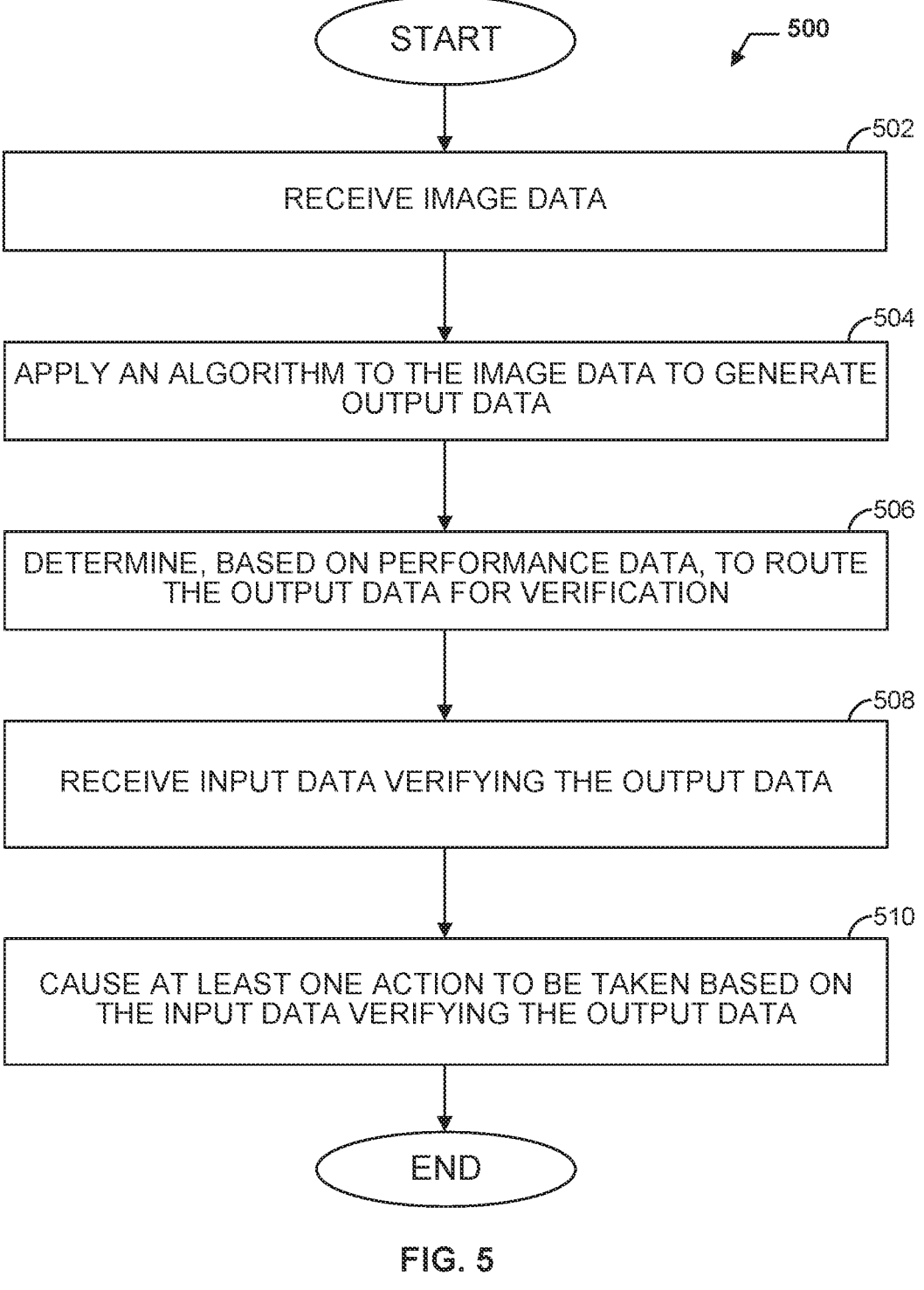
FIG. 5 illustrates an example method that may be performed by the AI model management computing device of FIG. 2 in accordance with some embodiments.

FIG. 5 illustrates a flowchart of an example method 500 that may be carried out by, for example, the AI model management computing device 102 of FIG. 1. Beginning at step 502, input data is received. For example, AI model management computing device 102 may receive input data, such as image data from one or more drones 104. At step 504, an algorithm is applied to the image data to generate output data. The algorithm may be, for example, an AI model, such as AI model 315. The output data may identify results of the application of the AI model.

Proceeding to step 506, a determination is made to route the output data for verification based on performance data. For example, performance engine 312 may generate performance data indicating system performance when the algorithm (e.g., AI model 315) is used to process input data. HIL supervision engine 306 may route data to HIL interaction engine 310 based on the generated performance data. At step 508, input data is received verifying the output data. For example, a user may provide an input via user interface 205 to HIL interaction engine 310 that the output data is correct. At step 510, at least one action is taken based on the verification of the output data. For example, decision engine 316 may cause one or more actions 38 to be taken. The method then ends.

Figure 6:
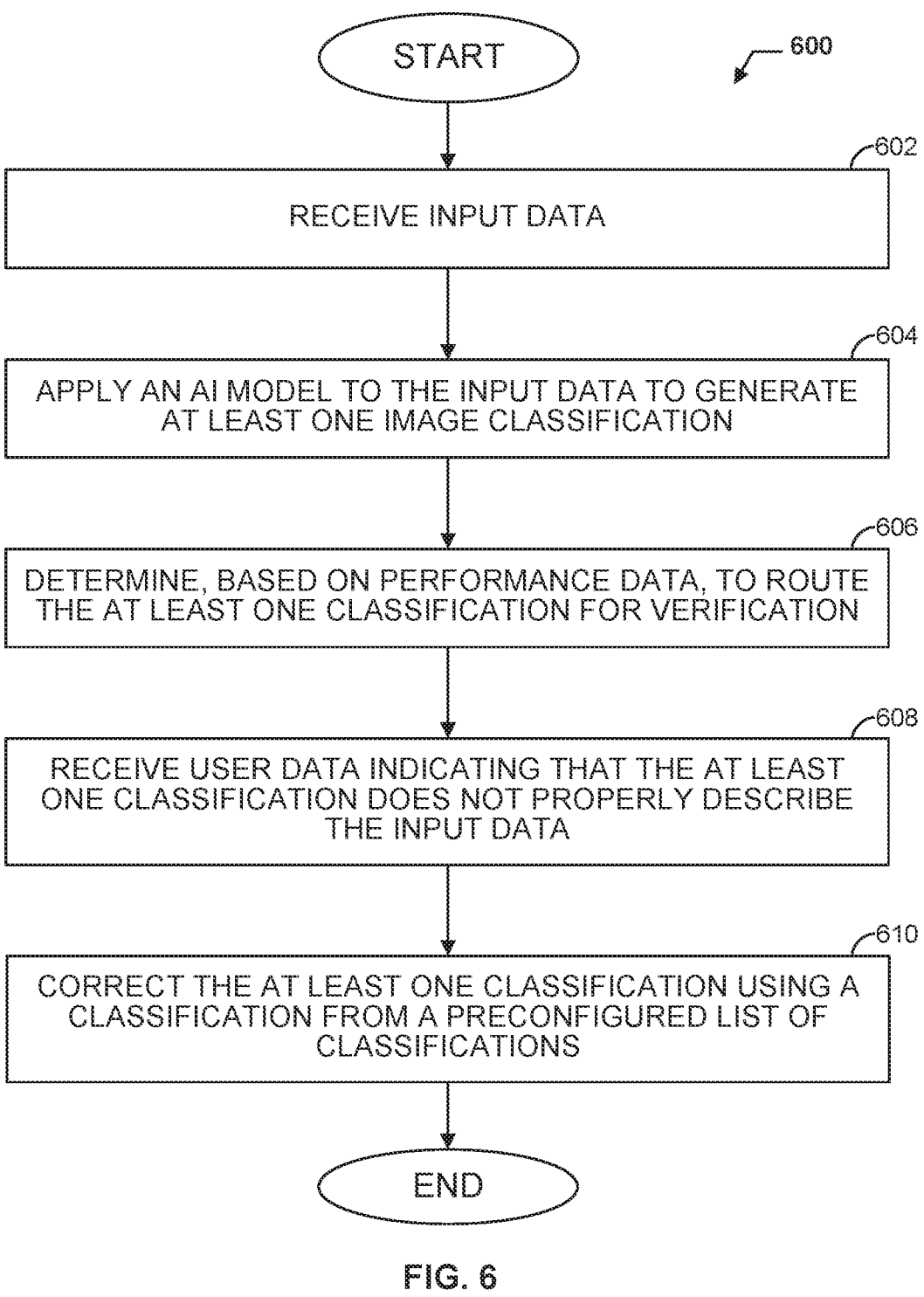
FIG. 6 illustrates another example method that may be performed by the AI model management computing device of FIG. 2 in accordance with some embodiments.

FIG. 6 illustrates a flowchart of another example method 600 that may be carried out by, for example, the AI model management computing device 102 of FIG. 1. Beginning at step 602, input data is received. For example, AI model management computing device 102 may receive image data from one or more drones 104. At step 604, an AI model is applied to the input data to generate at least one image classification. The AI model may be, for example, AI model 315. Proceeding to step 606, a determination is made to route the at least one classification for verification based on performance data. For example, performance engine 312 may generate performance data indicating system performance when the AI model is used to process image data. HIL supervision engine 306 may route data to HIL interaction engine 310 based on the generated performance data.

At step 608, user data is received indicating that the at least one classification does not properly describe the input data (e.g. image data). For example, a user may provide input to HIL interaction engine 310 that the classification provided by the AI model does not properly describe the input data. The AI model might incorrectly classify the audio as a "male voice"; when in fact a female was speaking. Both "male voice" and "female voice" are included in the pre-configured list of possible classifications, but the AI model mistakenly selected the wrong class. At step 610, the at least one classification is corrected using one of the classifications from the pre-configured list of classifications. The selected classification is provided as the correct classification, rather than the classification provided by the AI model. The method then ends.

Figure 7:
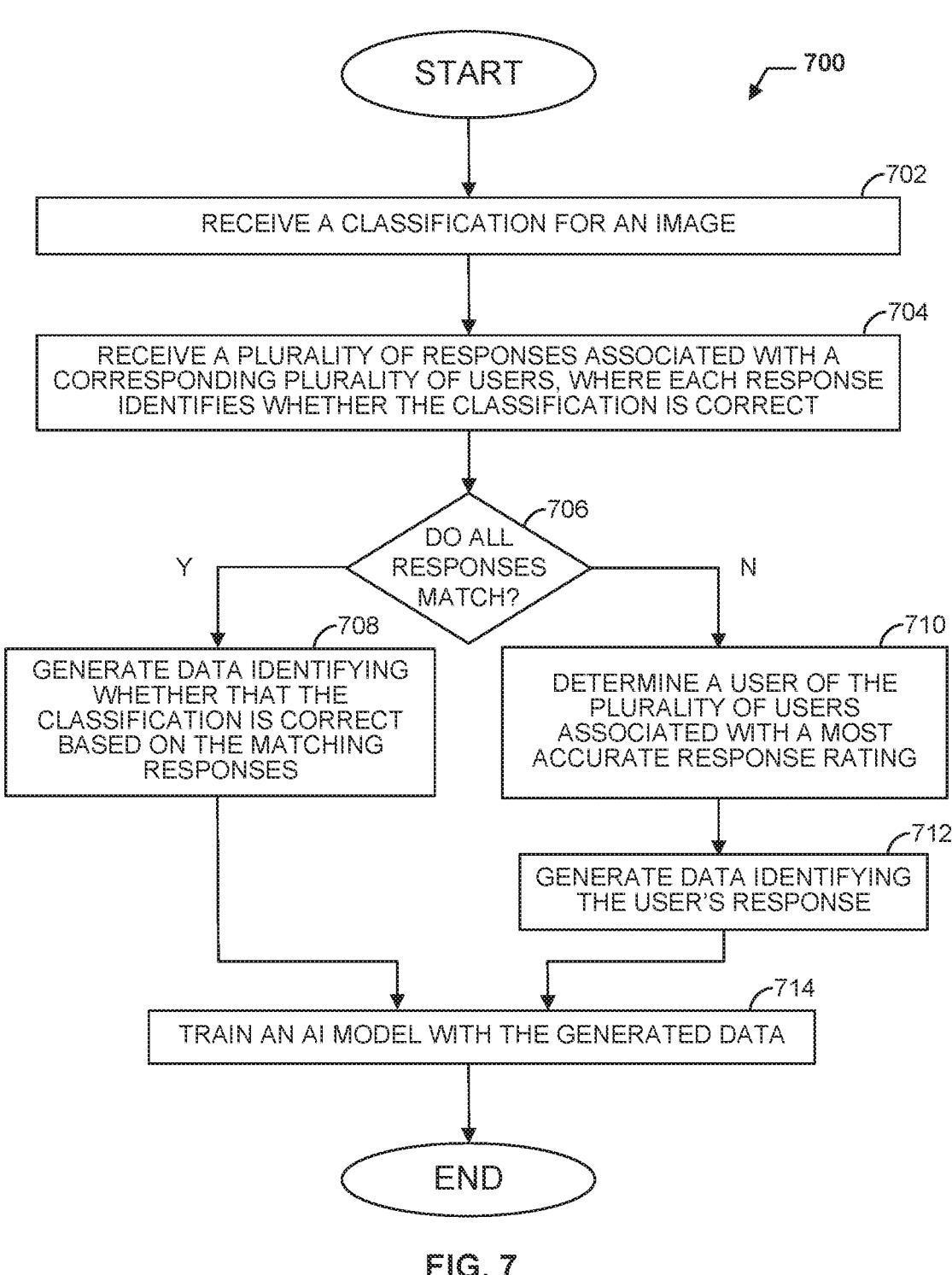
FIG. 7 illustrates another example method that may be performed by the AI model management computing device of FIG. 2 in accordance with some embodiments.

FIG. 7 illustrates a flowchart of yet another example method 700 that may be carried out by, for example, the AI model management computing device 102 of FIG. 1. Beginning at step 702, a classification for a task is received. For example, AI model 315 may receive image data from drone 104, and determine at least one classification based on the image data. At step 704, a plurality of responses associated with a plurality of users are received. Each response identifies whether the classification is correct. For example, HIL interaction engine 310 may operate in 3PC mode and receive three response from each of three persons identifying whether the classification provided by AI model 315 is correct.

Proceeding to step 706, a determination is made as to whether all responses match. If all responses match, the method proceeds to step 708. At step 708, data is generated identifying whether the classification is correct based on the matching responses. For example, if the matching responses indicate that the AI model classification is correct, the generated data indicates that the AI model classification is correct. If the matching responses indicate that the AI model classification is not correct, the generated data indicates that the AI model classification is not correct.

Back at step 706, if the responses do not match, the method proceeds to step 710. At step 710, a user of the plurality of users with a most accurate response rating is determined. The most accurate response rating may be based on historical decisions made by the user, and may be computed, for example, according to equations 5 and 6. In some examples, a user of the plurality of users with a most accurate response rating, and that has previously worked on a minimum number of tasks, is determined. From step 710, the method proceeds to step 712, where data is generated identifying the user's response. For example, if the user's response identifies that the AI model classification is correct, the generated data indicates that the AI model classification is correct. Otherwise, if the user's response identifies that the AI model classification is not correct, the generated data indicates that the AI model classification is not correct.

From either step 708 or step 710, the method proceeds to step 714. At step 714, an AI model is trained with the generated data. For example, AI model 315 may be trained with the generated data identifying whether its original classification was correct. The method then ends.

Although the methods described above are with reference to the illustrated flowcharts, it will be appreciated that many other ways of performing the acts associated with the methods can be used. For example, the order of some operations may be changed, and some of the operations described may be optional.

In addition, the methods and systems described herein can be at least partially embodied in the form of computer-implemented processes and apparatus for practicing those processes. The disclosed methods may also be at least partially embodied in the form of tangible, non-transitory machine-readable storage media encoded with computer program code. For example, the steps of the methods can be embodied in hardware, in executable instructions executed by a processor (e.g., software), or a combination of the two. The media may include, for example, RAMs, ROMs, CD-ROMs, DVD-ROMs, BD-ROMs, hard disk drives, flash memories, or any other non-transitory machine-readable storage medium. When the computer program code is loaded into and executed by a computer, the computer becomes an apparatus for practicing the method. The methods may also be at least partially embodied in the form of a computer into which computer program code is loaded or executed, such that, the computer becomes a special purpose computer for practicing the methods. When implemented on a general-purpose processor, the computer program code segments configure the processor to create specific logic circuits. The methods may alternatively be at least partially embodied in application specific integrated circuits for performing the methods.

Figure 8:
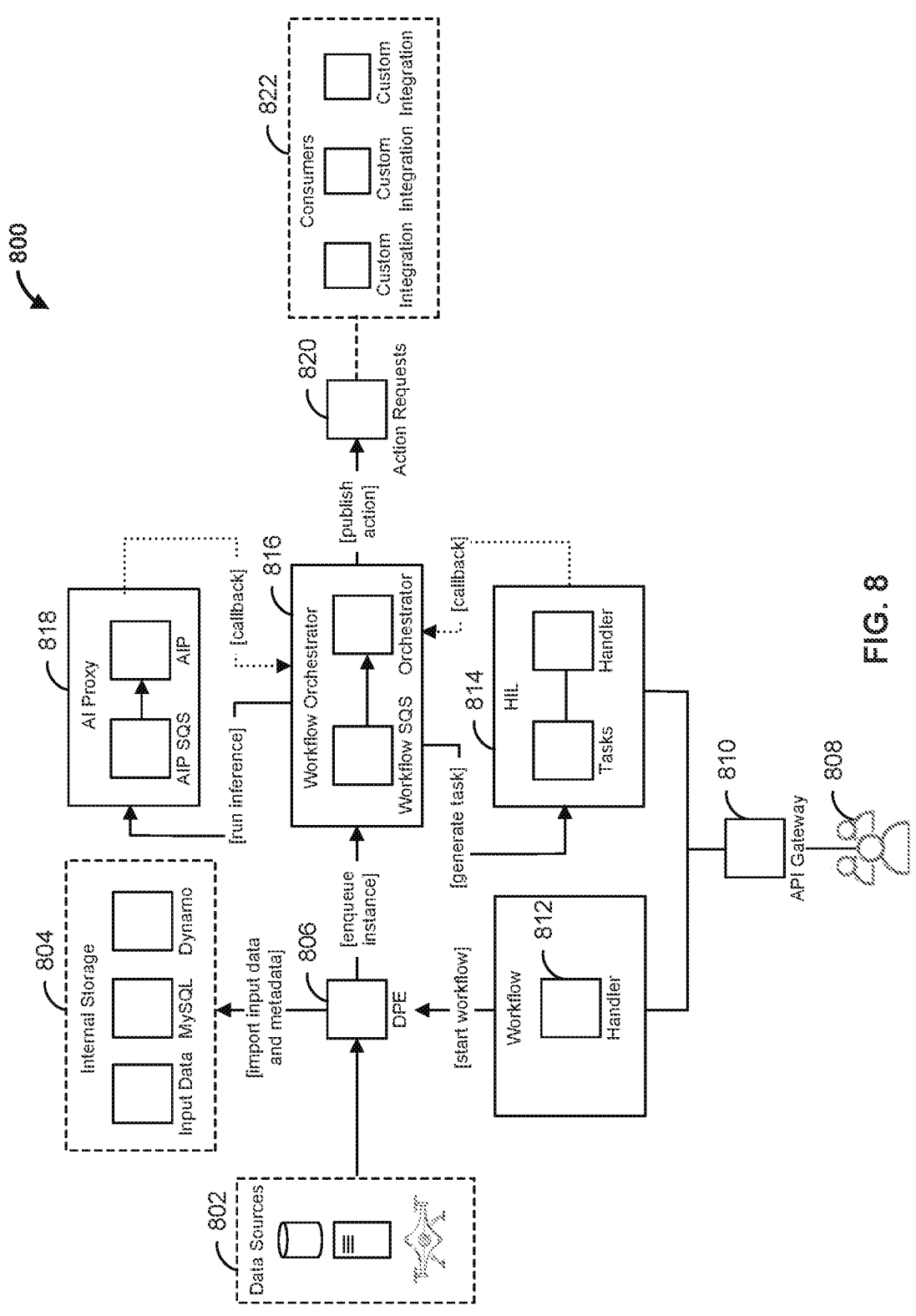
FIG. 8 illustrates a distributed AI management system in accordance with some embodiments.

FIG. 8 illustrates a block diagram of a distributed AI model management system 800. In this example, various functions may be performed by multiple computing devices in communication over a network. As illustrated, data provider engine 806 obtains data from one or more data sources 802. Data provider engine 806 may perform one or more of the functions described above with respect to data provider engine 302, for example. In this example, data provider engine 806 may be a batch process responsible for processing input data from data sources 802 and moving the data, which may identify tasks, to workflow orchestrator 816. Data provider engine 806 may provide the data via queues, for example Data provider engine 806 may also store data in internal storage 804, which may be a cloud based memory device, for example.

Workflow orchestrator 816 powers the workflow, receiving tasks from data provider engine 806. AI proxy 818 may provide access to one or more AI models. Workflow orchestrator 816 may provide data to AI proxy 818 (e.g., via one or more queues), for example, to run inference (e.g., such as on image data). When AI proxy completes processing, AI proxy 818 may identify completion and provide a response via, for example, callback functionality.

HIL module 814 may perform one or more of the functions described above with respect to HIL supervision engine 306, HIL optimization engine 308, and HIL interactive engine 310. For example, HIL module 814 is the component that users 808 interact with in order to solve tasks generated by the workflow. Users 808 may communicate with HIL module 814 via, via API gateway 810, for example. In some examples, API gateway 810 may exposes public endpoints of AI model management system 800 to allow for communication. Workflow handler 812 may include server-side functionality that serves customer requests. For example, workflow handler 812 may serve requests from users 808, such as a request to start a workflow.

In this example, actions are published at action requests 820. For example, HIL module 814 may determine that an action is to be taken for a given task in a workflow. Workflow orchestrator 816 may publish the action to action requests 820. The actions may then be consumed by custom integrations (e.g., third-party applications), such as the custom integrations associated with consumers 822.

The foregoing is provided for purposes of illustrating, explaining, and describing embodiments of these disclosures. Modifications and adaptations to these embodiments will be apparent to those skilled in the art and may be made without departing from the scope or spirit of these disclosures.

What is claimed is:

1. At least one computing device comprising at least one processor, the at least one computing device configured to:
   receive input data from at least one device;
   determine at least one classification based on applying an artificial intelligence model to the received input data;
   determine a performance of the artificial intelligence model based on previous classifications made by the artificial intelligence model; and
   determine whether to provide the classification for verification based on the performance of the artificial intelligence model, wherein:
   if the determination is to provide the classification for verification, the classification is provided for user verification; and
   if the determination is to not provide the classification for verification, at least one action is taken based on the classification.

2. The at least one computing device of claim 1, wherein if the determination is to provide the classification for verification, the at least one computing device is further configured to:
   provide for display the classification to at least one user;
   receive input data from the at least one user identifying whether the classification is correct; and
   determine whether the classification is correct based on the received input data.

3. The at least one computing device of claim 2, wherein the input data identifies that the classification is not correct, and further identifies the correct classification.

4. The at least one computing device of claim 1 wherein if the determination is to not provide the classification for verification, the at least one computing device is further configured to:

determine whether to provide the classification for verification based on at least one of:

one or more rules; and an estimated cost of using the classification and an estimated cost associated with providing the classification for verification.

5. The at least one computing device of claim 1 wherein the at least one action comprises transmitting a communication to a second computing device.

6. The at least one computing device of claim 5, wherein the communication identifies at least one of a status or condition of a system.

7. The at least one computing device of claim 1, wherein applying the artificial intelligence model to the received input data comprises determining one of a plurality of artificial intelligence models based on an operating mode, and applying the determined artificial intelligence model to the received input data.

8. The at least one computing device of claim 1, wherein determining the performance of the artificial intelligence model comprises receiving performance data indicating system performance of a system.

9. The at least one computing device of claim 1, wherein the at least one computing device is configured to:

determine a time threshold based on the received input data; and determine whether to provide the classification for verification based on the time threshold.

10. The at least one computing device of claim 9, wherein the at least one computing device is configured to:

provide the classification for user verification if a verification response can be received within the time threshold; and take the at least one action if the verification response cannot be received within the time threshold.

11. A method by at least one computing device the method comprising:

receiving input data from at least one device;

determining at least one classification based on applying an artificial intelligence model to the received input data;

determining a performance of the artificial intelligence model based on previous classifications made by the artificial intelligence model; and determining whether to provide the classification for verification based on the performance of the artificial intelligence model, wherein:

if the determination is to provide the classification for verification, the classification is provided for user verification; and if the determination is to not provide the classification for verification, at least one action is taken based on the classification.

12. The method of claim 11, wherein if the determination is to provide the classification for verification, the method further comprises:

providing for display the classification to at least one user;

receiving input data from the at least one user identifying whether the classification is correct; and determining whether the classification is correct based on the received input data.

13. The method of claim 11, wherein if the determination is to not provide the classification for verification, the method further comprises:

determining whether to provide the classification for verification based on at least one of:

one or more rules; and an estimated cost of using the classification and an estimated cost associated with providing the classification for verification.

14. The method of claim 11, wherein applying the artificial intelligence model to the received input data comprises determining one of a plurality of artificial intelligence models based on an operating mode, and applying the determined artificial intelligence model to the received input data.

15. The method of claim 11, further comprising:

determining a time threshold based on the received input data;

determining whether to provide the classification for verification based on the time threshold;

providing the classification for user verification if a verification response can be received within the time threshold; and taking the at least one action if the verification response cannot be received within the time threshold.

16. A non-transitory computer readable medium storing instructions thereon that, when executed by at least one processor, cause the at least one processor to perform operations comprising:

receiving input data from at least one device;

determining at least one classification based on applying an artificial intelligence model to the received input data;

determining a performance of the artificial intelligence model based on previous classifications made by the artificial intelligence model; and determining whether to provide the classification for verification based on the performance of the artificial intelligence model, wherein:

if the determination is to provide the classification for verification, the classification is provided for user verification; and if the determination is to not provide the classification for verification, at least one action is taken based on the classification.

17. The non-transitory computer readable medium of claim 16, wherein if the determination is to provide the classification for verification, the operations further comprise:

providing for display the classification to at least one user;

receiving input data from the at least one user identifying whether the classification is correct; and determining whether the classification is correct based on the received input data.

18. The non-transitory computer readable medium of claim 16, wherein if the determination is to not provide the classification for verification, the operations further comprise:

determining whether to provide the classification for verification based on at least one of:

one or more rules; and an estimated cost of using the classification and an estimated cost associated with providing the classification for verification.

19. The non-transitory computer readable medium of claim 16, wherein applying the artificial intelligence model to the received input data comprises determining one of a plurality of artificial intelligence models based on an operating mode, and applying the determined artificial intelligence model to the received input data.

20. The non-transitory computer readable medium of claim 16, wherein the operations further comprise:

determining a time threshold based on the received input data;

determining whether to provide the classification for verification based on the time threshold;

providing the classification for user verification if a verification response can be received within the time threshold; and taking the at least one action if the verification response cannot be received within the time threshold.

\* \* \* \* \*